US012305258B2

(12) United States Patent
Tsukamoto et al.

(10) Patent No.: US 12,305,258 B2
(45) Date of Patent: May 20, 2025

(54) STEEL SHEET AND MANUFACTURING METHOD THEREOF

(71) Applicant: NIPPON STEEL CORPORATION, Tokyo (JP)

(72) Inventors: Eriko Tsukamoto, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 54 days.

(21) Appl. No.: 18/010,585

(22) PCT Filed: Jul. 15, 2021

(86) PCT No.: PCT/JP2021/026632
§ 371 (c)(1),
(2) Date: Dec. 15, 2022

(87) PCT Pub. No.: WO2022/019209
PCT Pub. Date: Jan. 27, 2022

(65) Prior Publication Data
US 2023/0257843 A1 Aug. 17, 2023

(30) Foreign Application Priority Data
Jul. 20, 2020 (JP) .................. 2020-123531

(51) Int. Cl.
| | |
|---|---|
| *B32B 15/01* | (2006.01) |
| *C21D 6/00* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/60* | (2006.01) |

(52) U.S. Cl.
CPC .............. *C21D 9/46* (2013.01); *B32B 15/013* (2013.01); *C21D 6/001* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *C21D 2211/001* (2013.01); *C21D 2211/002* (2013.01); *C21D 2211/005* (2013.01); *C21D 2211/008* (2013.01)

(58) Field of Classification Search
CPC ..... C22C 38/001; C22C 38/002; C22C 38/02; C22C 38/04; C22C 38/06; C22C 38/12; C22C 38/14; C22C 38/60
USPC ........................................... 428/659
See application file for complete search history.

(56) References Cited

U.S. PATENT DOCUMENTS

| | | | |
|---|---|---|---|
| 2005/0081966 A1 | 4/2005 | Kashima et al. | |
| 2017/0044638 A1* | 2/2017 | Yokoi | ............... C23C 2/285 |
| 2019/0185954 A1 | 6/2019 | Kohsaka et al. | |

FOREIGN PATENT DOCUMENTS

| | | |
|---|---|---|
| JP | 2005-133201 A | 5/2005 |
| JP | 2017-145468 A | 8/2017 |
| WO | WO 2018/043453 A1 | 3/2018 |
| WO | WO-2019111029 A1 * 6/2019 | ........... B32B 15/012 |

* cited by examiner

*Primary Examiner* — Katherine A Christy
(74) *Attorney, Agent, or Firm* — Birch, Stewart, Kolasch & Birch, LLP

(57) ABSTRACT

This steel sheet has a predetermined chemical composition, the metallurgical structure at a thickness ¼ portion is, by area ratio, martensite: 40% to 97%, ferrite+bainite: 50% or less, residual austenite: 3% to 20% and a remainder in microstructure: 5% or less, the aspect ratio of residual austenite having an aspect ratio of 3 or more is 80% or more with respect to the total area of residual austenite, and the number of carbides having a grain diameter of 8 to 40 nm per square micrometer is five or more in the residual austenite.

12 Claims, No Drawings

STEEL SHEET AND MANUFACTURING METHOD THEREOF

TECHNICAL FIELD

The present invention relates to a steel sheet and a manufacturing method thereof.

Priority is claimed on Japanese Patent Application No. 2020-123531, filed Jul. 20, 2020, the content of which is incorporated herein by reference.

BACKGROUND ART

In order to suppress the amount of carbon dioxide exhausted from automobiles, attempts are underway to reduce the weights of automobile vehicle bodies while ensuring safety by using high strength steel sheets. However, generally, an increase in the strength of steel sheets degrades formability. In high strength steel sheets, it is difficult to satisfy both strength and formability, and several measures have been proposed to solve this problem.

For steel sheets that are used for components for vehicles, not only strength but also a variety of workability that is required at the time of forming components such as press workability and weldability are required. Specifically, from the viewpoint of press workability, there are many cases where excellent elongation (total elongation in tensile tests; El) and excellent hole expansibility (hole expansion rate; $\lambda$) are required for steel sheets.

For example, Patent Document 1 discloses a thin steel sheet having a composition of, by mass %, C: 0.07% or more and 0.20% or less, Si: 0.01% or more and 2.0% or less, Mn: 1.8% or more and 3.5% or less, P: 0.05% or less, S: 0.005% or less, Al: 0.01% or more and 2.0% or less, N: 0.0060% or less, Si+Al: 0.7% or more and a remainder including Fe and unavoidable impurities and a metallurgical structure in which a ferrite area ratio is 30% or less (including 0%), a tempered martensite area ratio is 70% or more (including 100%), a residual austenite area ratio is 4.5% or less (including 0%), and an average aspect ratio of iron-based carbides, precipitated in tempered martensite grains, having a grain size in the largest 10% is 3.5 or more.

CITATION LIST

Patent Document

Patent Document 1:
PTC International Publication No. WO 2018/043453

SUMMARY OF INVENTION

Technical Problem

However, when a full hard structure is present in a soft structure as in Patent Document 1, voids are likely to be generated at the interface between these structures, and, as a result, there is a possibility that hole expansibility may be impaired. In addition, generally, the structures of steel sheets are originally anisotropic. Therefore, when pressing or the like is performed on a steel sheet, the distortability also becomes anisotropic due to the anisotropy of the structures. However, in Patent Document 1, attention is not paid to such anisotropy of the distortability of the steel sheet.

In consideration of the above-described circumstance, an objective of the present invention is to provide a steel sheet having a high strength and being excellent in terms of elongation, hole expansibility and the anisotropy of distortability and a manufacturing method thereof.

Solution to Problem

The present invention has been made based on the above-described finding, and the gist of the present invention is as described below.

(1) A steel sheet according to one aspect of the present invention, in which a chemical composition contains, by mass %:
C: 0.20% to 0.40%,
Si: 0.5% to 2.0%,
Al: 0.001% to 1.0%,
Mn: 0.1% to 4.0%,
V: 0.150% or less,
Ti: 0.10% or less,
Nb: 0.10% or less,
P: 0.0200% or less,
S: 0.0200% or less,
N: 0.0200% or less,
O: 0.0200% or less,
Ni: 0% to 1.00%,
Mo: 0% to 1.00%,
Cr: 0% to 2.000%,
B: 0% to 0.0100%,
Cu: 0% to 0.500%,
W: 0% to 0.10%,
Ta: 0% to 0.10%,
Sn: 0% to 0.050%,
Co: 0% to 0.50%,
Sb: 0% to 0.050%,
As: 0% to 0.050%,
Mg: 0% to 0.050%,
Ca: 0% to 0.040%,
Y: 0% to 0.050%,
Zr: 0% to 0.050%, and
La: 0% to 0.050%
with a remainder comprising iron and impurities,
a total amount of V, Ti and Nb is 0.030% to 0.150%,
a metallurgical structure at a thickness ¼ portion is, by volume percentage,
martensite: 40% to 97%,
ferrite and bainite: 50% or less,
residual austenite: 3% to 20%, and
a remainder in microstructure: 5% or less,
an area ratio of residual austenite having an aspect ratio of 3 or more is 80% or more with respect to a total area of the residual austenite, and
the number of carbides having a grain diameter of 8 to 40 nm per square micrometer is five or more in the residual austenite.

(2) The steel sheet according to (1), in which the chemical composition may contain, by mass %, one or more selected from the group consisting of
Ni: 0.01% to 1.00%,
Mo: 0.01% to 1.00%,
Cr: 0.001% to 2.000%,
B: 0.0001% to 0.0100%,
Cu: 0.001% to 0.500%,
W: 0.001% to 0.10%,
Ta: 0.001% to 0.10%,
Sn: 0.001% to 0.050%,
Co: 0.001% to 0.50%,
Sb: 0.001% to 0.050%,
As: 0.001% to 0.050%,
Mg: 0.0001% to 0.050%, Ca: 0.001% to 0.040%,
Y: 0.001% to 0.050%,
Zr: 0.001% to 0.050%, and
La: 0.001% to 0.050%.
(3) The steel sheet according to (1) or (2) may have a hot-dip galvanized layer on a surface.
(4) The steel sheet according to (1) or (2) may have a hot-dip galvannealed layer on a surface.
(5) A manufacturing method of a steel sheet according to an aspect of the present invention has a hot rolling step of heating a slab having the chemical composition according to (1) or (2) at 1150° C. or higher for one hour or longer and hot-rolling the slab to produce a hot-rolled steel sheet in which prior austenite grain diameters are less than 30 μm,
a first cooling step of cooling the hot-rolled steel sheet to a temperature range of 800° C. or lower within three seconds from an end of the hot rolling step,
a coiling step of cooling the hot-rolled steel sheet after the first cooling step to a temperature range of 300° C. or lower at an average cooling rate of 30° C./s or faster and coiling the hot-rolled steel sheet,
a cold rolling step of cold-rolling the hot-rolled steel sheet after the coiling step at a rolling reduction of 0.10% to 30% to produce a cold-rolled steel sheet,
an annealing step of heating the cold-rolled steel sheet in a temperature range of 480° C. to Ac1 at an average heating rate of 0.5 to 1.5° C./s and soaking the cold-rolled steel sheet in a temperature range of Ac1 to Ac3,
a second cooling step of cooling the cold-rolled steel sheet after the annealing step at an average cooling rate of 4° C./s or faster, and
a temperature retention step of retaining the cold-rolled steel sheet after the second cooling step at 300° C. to 480° C. for 10 seconds or longer.
(6) The manufacturing method of a steel sheet according to (5), in which the hot rolling step may have a finish rolling step of continuously passing the slab through a plurality of rolling stands to perform rolling,
in the finish rolling step:
a rolling start temperature in the rolling stand third from a final of the rolling stands may be 850° C. to 1000° C.;
in each of the three last rolling stands in the finish rolling, the slab may be rolled at a rolling reduction of larger than 10%;
an interpass time between the individual rolling stands in the three last rolling stands in the finish rolling may be three seconds or shorter; and
$(T_n - T_{n+1})$ that is a difference between an exit temperature $T_n$ of the $n^{th}$ rolling stand and an entrance temperature $T_{n+1}$ of the $(n+1)^{th}$ rolling stand toward the downstream side of the four last rolling stands in the finish rolling may be 10° C. or more.
(7) The manufacturing method of a steel sheet according to (5) or (6), in which the cold-rolled steel sheet after the annealing step may be controlled to be in a temperature range of (zinc plating bath temperature−40°) C to (zinc plating bath temperature+50°) C and immersed in a hot-dip galvanizing bath, thereby forming hot-dip galvanized layer.
(8) The manufacturing method of a steel sheet according to (7), in which the hot-dip galvanized layer may be alloyed in a temperature range of 300° C. to 500° C.

Advantageous Effects of Invention

According to the aspects of the present invention, it is possible to provide a steel sheet having a high strength and being excellent in terms of elongation, hole expansibility and the anisotropy of distortability and a manufacturing method thereof.

DESCRIPTION OF EMBODIMENTS

Hereinafter, a steel sheet according to the present embodiment and a manufacturing method thereof will be described. However, the present invention is not limited only to a configuration disclosed in the present embodiment and can be modified in a variety of manners within the scope of the gist of the present invention. In addition, numerical limiting ranges expressed below using "to" include the lower limit value and the upper limit value in the ranges. Numerical values expressed with "less than" or "more than" are not included in numerical ranges. In the following description, % regarding the chemical composition of the steel sheet indicates "mass %" unless particularly otherwise designated.

In a steel sheet according to the present embodiment, the chemical composition contains, by mass %,
C: 0.20% to 0.40%,
Si: 0.50% to 2.0%,
Al: 0.0010% to 1.0%,
Mn: 0.1% to 4.0%,
V: 0.150% or less,
Ti: 0.10% or less,
Nb: 0.10% or less,
P: 0.0200% or less,
S: 0.0200% or less,
N: 0.0200% or less,
O: 0.0200% or less,
Ni: 0% to 1.00%,
Mo: 0% to 1.00%,
Cr: 0% to 2.000%,
B: 0% to 0.0100%,
Cu: 0% to 0.500%,
W: 0% to 0.10%,
Ta: 0% to 0.10%,
Sn: 0% to 0.050%,
Co: 0% to 0.50%,
Sb: 0% to 0.050%,
As: 0% to 0.050%,
Mg: 0% to 0.050%,
Ca: 0% to 0.040%,
Y: 0% to 0.050%,
Zr: 0% to 0.050%, and
La: 0% to 0.050%
with a remainder comprising iron and impurities,
a total amount of V, Ti and Nb is 0.030% to 0.150%,
the metallurgical structure at a thickness ¼ portion is, by volume percentage, martensite: 40% to 97%,
ferrite and bainite: 50% or less,
residual austenite: 3% to 20%, and
a remainder in microstructure: 5% or less,
residual austenite having an aspect ratio of 3 or more occupies 80% or more of all residual austenite, and
the number of carbides having a grain diameter of 8 to 40 nm per square micrometer is five or more in the residual austenite.

Hereinafter, the steel sheet according to one aspect of the present invention will be described.

First, the metallurgical structure of the steel sheet according to the present embodiment will be described. Hereinafter, microstructural fractions will be expressed by volume percentages, and thus the unit "%" of the microstructural fractions means "vol %". For structures for which the microstructural fractions are identified by image processing, area ratios are regarded as volume percentages. The metallurgical structure of the steel sheet according to the present embodiment represents the metallurgical structure at a thickness ¼ portion unless particularly otherwise described.

Metallurgical Structure

Ferrite and Bainite: 50% or Less in Total

Ferrite is a soft structure and is thus a structure that is easily distorted and contributes to improvement in elongation. However, in order to obtain a preferable strength, the volume percentage of ferrite needs to be limited.

In addition, bainite is soft compared with martensite and thus has an effect on improvement in ductility. However, in order to obtain a preferable strength, similar to ferrite, the volume percentage of bainite needs to be limited.

In the steel sheet according to the present embodiment, the volume percentages of ferrite and bainite are 50% or less in total. In order to increase the strength of the steel sheet, the total volume percentage of ferrite and bainite may be set to 40% or less or may be set to 35% or less in total. In order to obtain the effect of the present embodiment, the lower limit of the total volume percentage of ferrite and bainite is 0% since ferrite and bainite are not essential metallurgical structures.

Residual Austenite: 3% to 20%

Residual austenite has an effect on improving ductility by the transformation-induced plasticity effect (TRIP effect) to contribute to improvement in uniform elongation. In order to obtain the effect, the volume percentage of residual austenite is set to 3% or more. The volume percentage of residual austenite is preferably 5% or more and more preferably 7% or more.

On the other hand, when the volume percentage of residual austenite becomes excessive, the grain diameters of residual austenite become large. Residual austenite having such large grain diameters becomes coarse and full hard martensite after distortion. Martensite having a high C concentration that is formed from such residual austenite is likely to act as a starting point of cracking and degrades hole expansibility, which is not preferable. Therefore, the volume percentage of residual austenite is set to 20% or less. The volume percentage of residual austenite is preferably 18% or less and more preferably 16% or less.

In addition, in the present embodiment, as described below, it is possible to enhance the stability of residual austenite by controlling the aspect ratios of residual austenite and the number density of fine carbides in residual austenite. When the stability of residual austenite is high, it is possible to suppress strain-induced transformation to a fresh martensite phase having a high C concentration, which is a full hard phase. That is, when the stability of residual austenite is enhanced, fresh martensite having a high C concentration is less likely to be formed even when high strain is applied thereto. As a result, it is possible to suppress the occurrence of cracking in the formed fresh martensite having a high C concentration and the propagation of fractures, which leads to improvement in hole expansibility. Furthermore, the high stability of residual austenite makes it possible to suppress the localization of distortion and thus makes it possible to degrade the anisotropy of distortability.

Martensite: 40% to 97%

The metallurgical structure of the steel sheet according to the present embodiment includes 40% to 97% of martensite. Here, "martensite" is a general term of so-called fresh martensite and tempered martensite that are formed in the process of cooling and temperature rising in a heat treatment of steel.

Fresh martensite is a full hard structure having a high dislocation density and is thus a structure that contributes to improvement in tensile strength.

Tempered martensite is, similar to fresh martensite, a collection of lath-shaped crystal grains. On the other hand, unlike fresh martensite, tempered martensite is a full hard structure containing fine iron-based carbides inside due to tempering. Tempered martensite can be obtained by tempering fresh martensite formed by cooling or the like after annealing through a heat treatment or the like.

Bainite is also a structure containing fine iron-based carbides, but can be distinguished from tempered martensite due to the fact that there is a plurality of variants of the iron-based carbide in tempered martensite, but there is a single variant of the iron-based carbide in bainite.

In the steel sheet of the present embodiment, the volume percentage of martensite is set to 40% or more. The volume percentage of martensite is preferably set to 45% or more and more preferably set to 50% or more. In addition, the volume percentage of martensite is set to 97% or less, preferably set to 95% or less and more preferably set to 90% or less.

Remainder in Microstructure: 5% or Less

As the structures of the remainder other than the above-described ferrite, bainite, residual austenite and martensite, pearlite and the like are exemplary examples. In order to obtain a desired characteristic of the steel sheet according to the present embodiment, the volume percentage of the remainder in microstructure is set to 5% or less, preferably set to 4% or less and more preferably set to 3% or less. The remainder in microstructure may not be present, and the lower limit thereof is 0%.

Proportion of Residual Austenite Having Aspect Ratio of 3 or More: 80% or More of all Residual Austenite When residual austenite is given a needle-like shape, the stability of residual austenite at the time of receiving strain improves. That is, when the stability of residual austenite is high, it is possible to suppress strain-induced transformation to fresh martensite having a high C concentration, which is a full hard phase, even when residual austenite receives strain due to working. This mechanism will be described below.

Residual austenite transforms to martensite stepwise from grain boundaries, and this transformation induces strain. When this martensitic transformation proceeds, dislocations initiated in the vicinity of a grain boundary move through the inside of the grain to the grain boundary on the opposite side, and the dislocations are accumulated. In a case where residual austenite has a needle-like shape, the distance from the vicinity of the grain boundary where the dislocations are initiated to the grain boundary where the dislocations are accumulated is short. Therefore, a repulsive force is generated between the accumulated dislocation and a dislocation that is newly initiated, and strain that is induced by martensitic transformation is not allowed. Since martensitic transformation is inhibited by the above-described mechanism, the stability of residual austenite improves.

Residual austenite that is formed with no control over the shape does not become a needle-like structure, and thus the stability varies with individual residual austenite. Therefore, the anisotropy of distortability is large in residual austenite that is not a needle-like structure. On the other hand, in the steel sheet according to the present embodiment, residual austenite is stabilized by giving a needle-like shape, and thus it is possible to reduce the anisotropy of distortability.

In the present embodiment, "residual austenite given a needle-like shape" is defined as "residual austenite having an aspect ratio of 3 or more". In the steel sheet of the present embodiment, the area ratio of residual austenite having an aspect ratio of 3 or more is 80% or more with respect to the total area of residual austenite. When residual austenite having an aspect ratio of 3 or more is 80% or more of all residual austenite, the anisotropy of distortability is reduced. Residual austenite having an aspect ratio of 3 or more is preferably 83% or more and more preferably 85% or more of all residual austenite. The upper limit of the proportion of residual austenite having an aspect ratio of 3 or more in all residual austenite is not particularly determined, but is ideally 100%.

Number Density of Carbides Having Grain Diameter of 8 to 40 nm in Residual Austenite: Five Carbides/$\mu m^2$ or More In the present embodiment, residual austenite is stabilized not only by giving a needle-like shape to residual austenite but also by controlling the amount of fine precipitates in residual austenite. This is because the fine precipitates in residual austenite stop the propagation of strain-induced transformation from grain boundaries. In the steel sheet of the present embodiment, fine carbides are precipitated in residual austenite. The scope of the carbide in the present embodiment includes a carbonitride.

In the present embodiment, the grain diameters of the carbides effective for suppressing the propagation of strain-induced transformation is 8 nm or more. That is, carbides having a grain diameter of less than 8 nm do not effectively act for the suppression of the propagation of strain-induced transformation. Therefore, in the present embodiment, carbides having a grain diameter of less than 8 nm are not considered as precipitates that need to be controlled. On the other hand, an excessive increase in the grain diameter of the carbide means a concern of the carbide itself being likely to crack and likely to cause breakage. Therefore, the grain diameters of the carbides are preferably 40 nm or less. From the above-described viewpoints, in the present embodiment, the number density of carbides having a grain diameter of 8 to 40 nm is controlled.

In the steel sheet according to the present embodiment, in order to suppress the propagation of strain-induced transformation, the number density of carbides having a grain diameter of 8 to 40 nm in residual austenite is 5 carbides/$\mu m^2$ or more. The number density of the carbides is preferably 6 carbides/$\mu m^2$ or more and more preferably 7 carbides/$\mu m^2$ or more.

In such a case, preferable characteristics can be obtained by stabilizing residual austenite. The upper limit of the number density of carbides having a grain diameter of 8 to 40 nm in residual austenite is not particularly determined, but is approximately 100 carbides/$\mu m^2$ in the composition and the heat treatment of the present embodiment.

Next, the identification of ferrite, bainite, residual austenite and martensite and the calculation of the volume percentages will be described. As described above, the values of area ratios calculated by image processing are regarded as volume percentages. In addition, in the present embodiment, the metallurgical structure of a cross section parallel to a rolling direction at a ¼ depth of the sheet thickness (thickness ¼ portion) from the surface of the steel sheet is regulated. The reason therefor is the metallurgical structure at this position shows atypical metallurgical structure of the steel sheet. In the present embodiment, the "¼ depth position" of the sheet thickness is an observation position for specifying the metallurgical structure and is not strictly limited to the ¼ depth. A metallurgical structure that is obtained by observing somewhere in a range of ⅛ to ⅜ depth of the sheet thickness can be regarded as the metallurgical structure at the ¼ depth position.

The volume percentage of residual austenite can be calculated by measuring diffraction intensities using X-rays.

In the measurement using X-rays, a portion from the sheet surface of a sample to a depth ¼ position is removed by mechanical polishing and chemical polishing, and the microstructural fraction of residual austenite can be calculated from the integrated intensity ratio of the diffraction peaks of (200) and (211) of a bcc phase and (200), (220) and (311) of an fcc phase using MoKα rays at a sheet thickness ¼ position. As a general calculation method, a five-peak method is used.

The volume percentage of fresh martensite is obtained by the following procedure.

An observed section of the sample is etched with a LePera solution, and a secondary electron image of a 100 μm×100 μm region in the sheet thickness ⅛ to ⅜ range, in which the sheet thickness ¼ is centered, obtained with a field emission scanning electron microscope (FE-SEM) is observed at a magnification of 3000 times. Since fresh martensite and residual austenite are not corroded by LePera corrosion, the area ratio of uncorroded regions is the total area ratio of fresh martensite and residual austenite. In the present embodiment, the total area ratio of these fresh martensite and residual austenite is regarded as the "total volume percentage" of these structures. The volume percentage of fresh martensite can be calculated by subtracting the volume percentage of residual austenite measured with X-rays from the area ratio of the uncorroded regions.

The volume percentages of ferrite, bainite and tempered martensite can be determined from a secondary electron image obtained by observing the ⅛ to ⅜ sheet thickness range (that is, the sheet thickness range in which the ¼ sheet thickness position is centered) with FE-SEM. The observed section is a sheet thickness cross section of the steel sheet parallel to the rolling direction. Polishing and Nital etching are performed on the observed section, and a 100 μm×100 μm region in the sheet thickness ⅛ to ⅜ range, in which the sheet thickness ¼ is centered, on the observed section is observed at a magnification of 3000 times. The same region as the region observed by the LePera corrosion can be confirmed by leaving a plurality of indentations around the region observed by the LePera corrosion. There is a case where the microstructure (configuration elements) of the steel sheet significantly differs in each of the vicinity of the steel sheet surface and the vicinity of the steel sheet center in the sheet thickness direction from the microstructure in other portions due to decarburization and Mn segregation. Therefore, in the present embodiment, the microstructure is observed at the ¼ sheet thickness position as a base. Ferrite is a structure in which the insides of grain boundaries appear in uniform contrast. Bainite is a collection of lath-shaped crystal grains and is a structure in which iron-based carbides having a major axis of 20 nm or more are not contained or a structure in which iron-based carbides having a major axis of 20 nm or more are contained and the carbides belong to a single variant, that is, a group of iron-based carbides elongated in the same direction. Here, the group of iron-based carbides elongated in the same direction refers to a group in which the difference in the elongation direction in the group of iron-based carbides is 5° or less. Tempered martensite can be distinguished from bainite due to the fact that cementite in the structure has a plurality of variants.

The volume percentage of martensite can be obtained by combining the volume percentage of fresh martensite and the volume percentage of tempered martensite specified by the above-described method.

The proportion of residual austenite having an aspect ratio of 3 or more in all residual austenite is determined by an EBSD analysis method in which FE-SEM is used.

Specifically, a test piece in which a sheet thickness cross section of the steel sheet parallel to the rolling direction is used as an observed section is collected, the observed section of the test piece is polished, then, a strain-influenced layer is removed by electrolytic polishing, and EBSD analysis is performed on a 100 µm×100 µm region in a sheet thickness ⅛ to ⅜ range, in which the sheet thickness ¼ is centered, at measurement steps set to 0.05 µm. The measurement magnification in the present embodiment is set to 3000 times.

A residual austenite map is produced from measured data, residual austenite having an aspect ratio of 3 or more is extracted, and the area fraction is obtained.

The number density of the carbides having a grain diameter of 8 to 40 nm in residual austenite is measured as described below.

In a thin film sample of a round region having a diameter of 3.0 mm at the ¼ position from the surface of the steel sheet, three visual fields in a region containing austenite phase are observed using a transmission electron microscope (TEM) at a magnification of 500,000 times. A precipitate from which the corresponding alloy carbide-forming elements (Ti, Nb and V) are detected by the energy-dispersive X-ray spectroscopy (EDX) in each visual field is determined as a carbide. The area of each precipitate in austenite phase is obtained using an image analysis apparatus and converted into a circle-converted diameter.

A value obtained by calculating the number of carbides having a circle-converted diameter of 8 nm or more and 40 nm or less and dividing this by the area of the observed visual field is regarded as the number density of carbides in each visual field. The same operation is performed on the three visual fields, and the obtained arithmetic mean is determined as the number density of the carbides having a circle-converted diameter of 8 to 40 nm.

Next, the reasons for limiting the chemical composition of the steel sheet according to the present embodiment will be described. Hereinafter, "%" relating to the composition means "mass %".

Chemical Composition

C: 0.20% to 0.40%

C is an element that ensures a predetermined amount of martensite and improves the strength of the steel sheet. When the C content is 0.20% or more, it is possible to obtain a predetermined amount of martensite and to ensure a desired tensile strength.

The C content is preferably 0.25% or more.

In addition, in order to ensure the hole expansibility, the C content is set to 0.40% or less. The C content is preferably 0.35% or less.

Si: 0.5% to 2.0%

Si is a useful element for increasing the strength of the steel sheet by solid solution strengthening. In addition, Si suppresses the formation of cementite and is thus an effective element for forming residual austenite after annealing by accelerating the concentration of carbon (C) in austenite. In addition, Si has an effect on segregating carbon (C) on γ grain boundaries in an annealing step to be described below. When the Si content is set to 0.5% or more, it is possible to obtain the effect of the above-described action. The Si content is preferably 0.6% or more and more preferably 0.7% or more.

In addition, the Si content is set to 2.0% or less in consideration of the chemical convertibility and the plating property during welding. The Si content is preferably 1.9% or less and more preferably 1.8% or less.

Al: 0.0010% or More and 1.0% or Less

Al is an element that acts as a deoxidizing agent, suppresses the precipitation of cementite and contributes to the stabilization of residual austenite. In order to obtain the above-described effect of Al being contained, the Al content is set to 0.001% or more. The Al content is preferably 0.005% or more and more preferably 0.010% or more. However, from the viewpoint of suppressing the workability of the steel sheet being degraded by a coarse Al oxide, the Al content is set to 1.0% or less. The Al content is preferably 0.9% or less and more preferably 0.8% or less.

Mn: 0.1% to 4.0%

Mn has an action of improving the hardenability of steel and is an effective element for obtaining the metallurgical structure of the present embodiment. When the Mn content is set to 0.10% or more, it is possible to obtain the metallurgical structure of the present embodiment. The Mn content is preferably 1.0% or more and more preferably 1.5% or more.

On the other hand, in consideration of the hardenability improvement effect being degraded by the segregation of Mn and an increase in the material cost, the Mn content is set to 4.0% or less. The Mn content is preferably 3.5% or less.

V: 0.150% or Less, Ti: 0.10% or Less, Nb: 0.10% or Less and V+Ti+Nb: 0.030% to 0.150%

V, Ti and Nb are all important elements for controlling the form of a carbide, and there is a need to appropriately control the total amount of V, Ti and Nb in order to homogeneously and finely precipitate in residual austenite. Since not all of V, Ti and Nb need to be contained, the lower limit of the amount of each element of V, Ti and Nb is zero, but the total content of V, Ti and Nb is 0.030% or more in order to form carbides in the present embodiment. The total amount of V, Ti and Nb is preferably 0.040% or more and more preferably 0.050% or more. On the other hand, when the total amount of V, Ti and Nb is too large, complex carbides are precipitated during hot rolling, and these complex carbides become coarse in the following steps. From the viewpoint of appropriately controlling the form of a carbide, The total amount of V, Ti and Nb is 0.030% or more and 0.150% or less. The total amount of V, Ti and Nb is preferably 0.120% or less and more preferably 0.100% or less.

On the other hand, when the V content is too large, the growth of V carbides is accelerated, a large number of coarse V carbides are precipitated to cause an increase in the strength and deterioration of the ductility of steel, and there is a concern that the formability of the steel sheet may deteriorate. In addition, Ti is an element that may form a coarse Ti oxide or TiN to degrade the formability of the steel sheet. Furthermore, when the Ti content is too large, Ti carbides are precipitated in a hot rolling process and become coarse in the following steps. When the Nb content is too large, Nb carbides are precipitated in the hot rolling process and become coarse in the following steps. Therefore, significant deterioration of the ductility is caused together with an increase in the strength of the steel sheet, and there is a concern that the formability of the steel sheet may deteriorate. For the above-described reasons, the upper limit of each element is set to V: 0.150% or less, Ti: 0.10% or less and Nb: 0.10% or less.

P: 0.0200% or Less

P is an impurity element and is an element that is segregated in the sheet thickness center portion of the steel sheet to impair the toughness and embrittles a welded part. When the P content exceeds 0.0200%, the weld strength or the hole expansibility significantly deteriorates. Therefore, the P content is set to 0.0200% or less. The P content is preferably 0.0100% or less.

The P content is preferably as small as possible; however, when the P content is reduced to less than 0.0001% in practical steel sheets, the manufacturing cost significantly increases, which becomes economically disadvantageous. Therefore, the lower limit value of the P content may be set to 0.00010% or more.

S: 0.0200% or Less

S is an impurity element and is an element that impairs the weldability and impairs the manufacturability during casting and during hot rolling. In addition, S is also an element that forms coarse MnS to impair the hole expansibility. When the S content exceeds 0.0200%, the weldability, the manufacturability, and the hole expansibility significantly deteriorate. Therefore, the S content is set to 0.0200% or less.

The S content is preferably as small as possible; however, when the S content is reduced to less than 0.0001% in practical steel sheets, the manufacturing cost significantly increases, which becomes economically disadvantageous. Therefore, the lower limit value of the S content may be set to 0.0001% or more.

N: 0.0200% or Less

N is an element that forms a coarse nitride, impairs the bendability or the hole expansibility and causes the generation of a blowhole during welding. When the N content exceeds 0.0200%, the deterioration of the hole expansibility or the generation of a blowhole becomes significant. Therefore, the N content is set to 0.0200% or less.

The N content is preferably as small as possible; however, when the N content is reduced to less than 0.0001% in practical steel sheets, the manufacturing cost significantly increases, which becomes economically disadvantageous. Therefore, the lower limit value of the N content may be set to 0.0001% or more.

O: 0.0200% or Less

O is an element that forms a coarse oxide, impairs the bendability or the hole expansibility and causes the generation of a blowhole during welding. When the O content exceeds 0.0200%, the deterioration of the hole expansibility or the generation of a blowhole becomes significant. Therefore, the O content is set to 0.0200% or less.

The O content is preferably as small as possible; however, when the O content is reduced to less than 0.0005% in practical steel sheets, the manufacturing cost significantly increases, which becomes economically disadvantageous. Therefore, the lower limit value of the O content may be set to 0.0005% or more.

The steel sheet according to the present embodiment may contain one or more selected from the group consisting of Ni: 0.010% to 1.00%, Mo: 0.010% to 1.00%, Cr: 0.001% to 2.000%, B: 0.0001% to 0.0100%, Cu: 0.001% to 0.500%, W: 0.001% to 0.10%, Ta: 0.001% to 0.10%, Sn: 0.001% to 0.050%, Co: 0.001% to 0.50%, Sb: 0.001% to 0.050%, As: 0.001% to 0.050%, Mg: 0.0001% to 0.050%, Ca: 0.001% to 0.040%, Y: 0.001% to 0.050%, Zr: 0.001% to 0.050% and La: 0.001% to 0.050%. Since these elements may not be contained, the lower limit of each of these elements is 0%.

Ni: 0% to 1.00%

Ni is an effective element for improving the strength of the steel sheet. The Ni content may be 0%, but the Ni content is preferably 0.001% or more in order to obtain the above-described effect. On the other hand, when the Ni content is too large, there is a concern that the ductility of the steel sheet may deteriorate to cause the deterioration of the formability. Therefore, the Ni content is preferably 1.00% or less.

Mo: 0% to 1.00%

Similar to Cr, Mo is an element that contributes to the high-strengthening of the steel sheet. This effect can be obtained even when the Mo content is small. The Mo content may be 0%, but the Mo content is preferably 0.01% or more in order to obtain the above-described effect. On the other hand, when the Mo content exceeds 1.00%, coarse Mo carbides are formed and there is a concern that the cold formability of the steel sheet may deteriorate. Therefore, the Mo content is preferably 1.00% or less.

Cr: 0% to 2.000%

Cr is an element that improves the hardenability of steel and contributes to high-strengthening and is an effective element for obtaining the above-described metallurgical structure. Therefore, Cr may be contained. In order to sufficiently obtain the above-described effect, the Cr content is preferably set to 0.01% or more. However, even when Cr is excessively contained, the effect of the above-described action is saturated, which makes it economically disadvantageous to excessively contain Cr. Therefore, even in a case where Cr is contained, the Cr content is set to 2.000% or less.

B: 0% to 0.0100%

B is an element that suppresses the formation of ferrite and pearlite in a cooling process from austenite and accelerates the formation of a low temperature transformation structure such as bainite or martensite. In addition, B is a helpful element for the high-strengthening of steel. This effect can be obtained even when the B content is small. The B content may be 0%, but the B content is preferably set to 0.00010% or more in order to obtain the above-described effect. However, when the B content is too large, a coarse B oxide is formed, as a result, the B oxide acts as a starting point for the generation of voids during press forming, and there is a concern that the formability of the steel sheet may deteriorate. Therefore, the B content is preferably 0.0100% or less. For the identification of less than 0.0001% of B, close attention needs to be paid to analysis. In a case where the B content is below the lower detection limit of an analyzer, the B content may be regarded as 0% in some cases.

Cu: 0% to 0.500%

Cu is an element that contributes to improvement in the strength of the steel sheet. This effect can be obtained even when the Cu content is small. The Cu content may be 0%, but the Cu content is preferably 0.0010% or more in order to obtain the above-described effect. However, when the Cu content is too large, surface hot shortness is caused and there is a concern that productivity in hot rolling may be degraded. Therefore, the Cu content is preferably 0.500% or less.

W: 0% to 0.10%

W is an effective element for improving the strength of the steel sheet. The W content may be 0%, but the W content is preferably 0.001% or more in order to obtain the above-described effect. On the other hand, when the W content is too large, a large number of fine W carbides are precipitated, an excessive increase in the strength and the deterioration of the ductility of the steel sheet are caused, and there is a concern that the cold workability of the steel sheet may be degraded. Therefore, the W content is preferably set to 0.10% or less.

Ta: 0% to 0.10%

Similar to W, Ta is also an effective element for improving the strength of the steel sheet. The Ta content may be 0%, but the Ta content is preferably 0.001% or more in order to obtain the above-described effect. On the other hand, when the Ta content is too large, a large number of fine Ta carbides are precipitated, an excessive increase in the strength and the deterioration of the ductility of the steel sheet are caused, and there is a concern that the cold workability of the steel sheet may be degraded. Therefore, the Ta content is set to 0.10% or less, more preferably 0.02% or less, and still more preferably 0.010% or less.

Sn: 0% to 0.050%

Sn is an element that can be contained in the steel sheet in the case of using a scrap as a raw material of the steel sheet. In addition, there is a concern that Sn may cause the deterioration of the cold formability of the steel sheet attributed to the embrittlement of ferrite. Therefore, the Sn content is preferably as small as possible. The Sn content is set to 0.050% or less, is preferably 0.040% or less, and may be 0%. However, reduction in the Sn content to less than 0.001% causes an excessive increase in the refining cost, and thus the Sn content may be set to 0.001% or more.

Co: 0% to 0.50%

Co is an effective element for improving the strength of the steel sheet. The Co content may be 0%, but the Co content is preferably 0.001% or more in order to obtain the above-described effect. On the other hand, when the Co content is too large, there is a concern that the ductility of the steel sheet may deteriorate to cause the deterioration of the formability. Therefore, the Co content is preferably set to 0.50% or less.

Sb: 0% to 0.050%

Similar to Sn, Sb is an element that can be contained in the steel sheet in the case of using a scrap as a raw material of the steel sheet. There is a concern that Sb may be strongly segregated in grain boundaries to cause the embrittlement of the grain boundaries, the deterioration of the ductility and the deterioration of the cold formability. Therefore, the Sb content is preferably as small as possible. The Sb content is set to 0.050% or less, is preferably 0.040% or less, and may be 0%. However, reduction in the Sb content to less than 0.001% causes an excessive increase in the refining cost, and thus the Sb content may be set to 0.001% or more.

As: 0% to 0.050%

Similar to Sn and Sb, As is an element that can be contained in the steel sheet in the case of using a scrap as a raw material of the steel sheet. There is a concern that As may be strongly segregated in grain boundaries to cause the deterioration of the cold formability. Therefore, the As content is preferably as small as possible. The As content is set to 0.050% or less, is preferably 0.040%, and may be 0%. However, reduction in the As content to less than 0.001% causes an excessive increase in the refining cost, and thus the As content may be set to 0.001% or more.

Mg: 0% to 0.050%

Mg controls the forms of sulfides or oxides and contributes to improvement in the bending formability of the steel sheet. This effect can be obtained even when the Mg content is small. The Mg content may be 0%, but the Mg content is preferably 0.00010% or more in order to obtain the above-described effect. However, when the Mg content is too large, there is a concern that the deterioration of the cold formability may be caused due to the formation of a coarse inclusion. Therefore, the Mg content is set to 0.050% or less and is preferably 0.040% or less.

Ca: 0% to 0.040%

Similar to Mg, Ca is an element capable of controlling the forms of sulfides with a small amount. The Ca content may be 0%, but the Ca content is preferably 0.001% or more in order to obtain the above-described effect. However, when the Ca content is too large, a coarse Ca oxide is formed, and the Ca oxide may act as a starting point for the generation of cracks during cold forming. Therefore, the Ca content is set to 0.040% or less and is preferably 0.030% or less.

Y: 0% to 0.050%

Similar to Mg and Ca, Y is an element capable of controlling the forms of sulfides with a small amount. The Y content may be 0%, but the Y content is preferably 0.001% or more in order to obtain the above-described effect. However, when the Y content is too large, a coarse Y oxide is formed, and there is a concern that the cold formability may deteriorate. Therefore, the Y content is set to 0.050% or less and is more preferably 0.040% or less.

Zr: 0 to 0.050%

Similar to Mg, Ca and Y, Zr is an element capable of controlling the forms of sulfides with a small amount. The Zr content may be 0%, but the Zr content is preferably 0.0010% or more in order to obtain the above-described effect. However, when the Zr content is too large, a coarse Zr oxide is formed, and there is a concern that the cold formability may deteriorate. Therefore, the Zr content is preferably 0.050% or less and more preferably 0.040% or less.

La: 0% to 0.050%

La is an effective element for controlling the forms of sulfides with a small amount. The La content may be 0%, but the La content is preferably 0.001% or more in order to obtain the above-described effect. However, when the La content is too large, a La oxide is formed, and there is a concern that the cold formability may deteriorate. Therefore, the La content is set to 0.050% or less and is preferably 0.040% or less.

In the chemical composition of the steel sheet according to the present embodiment, the remainder except the above-described elements is Fe and an impurities. "Impurity" mentioned herein is an element that is incorporated from a steel raw material (ore, scrap or the like) or in a steelmaking process and is permitted to be present to an extent that the characteristics of the steel sheet according to the present embodiment are not impaired.

The above-described chemical composition of the steel sheet may be measured by an ordinary analytical method. For example, the chemical composition may be measured using inductively coupled plasma-atomic emission spectrometry (ICP-AES). C and S may be measured using an infrared absorption method after combustion, and N may be measured using an inert gas fusion thermal conductivity method. O may be measured using an inert gas fusion-nondispersive infrared absorption method.

The steel sheet according to the present embodiment may have a hot-dip galvanized layer on a surface. The composition of the hot-dip galvanized layer of the steel sheet according to the present embodiment is not particularly limited. Plating on the steel sheet according to the present embodiment may be hot-dip galvanizing or hot-dip galvannealing or may be alloy plating obtained by alloying the above-described plating. In addition, it is not hindered for the steel sheet according to the present embodiment to have another plating (for example, aluminum plating or the like).

The compositions of the hot-dip galvanized layer and the hot-dip galvannealed layer preferably contain less than 7 mass % of Fe, and the composition of the alloy plating preferably contains 7 mass % or more and 15 mass % or less of Fe.

Characteristics

[Tensile Strength]

In the steel sheet according to the present embodiment, the tensile strength (TS) is 980 MPa or more. The upper limit of the tensile strength is not particularly limited. The tensile strength is measured by collecting a JIS No. 5 tensile test piece described in JIS Z 2201 from the steel sheet such that the longitudinal direction becomes perpendicular to the rolling direction and then performing a tensile test in accordance with JIS Z 2241: 2011.

[Elongation (%)>(49−0.03×TS)]

In the steel sheet according to the present embodiment, the elongation (%) has a value represented by the following formula (1) from the viewpoint of the formability.

$$\text{Elongation (\%)} > (49 - 0.03 \times TS) \quad (1)$$

In the formula (1), TS represents a tensile strength in the unit of MPa. In addition, in the measuring method of the tensile strength, as described above, the tensile strength is measured by collecting a JIS No. 5 tensile test piece described in JIS Z 2201 from the steel sheet in a direction perpendicular to the rolling direction and performing a tensile test in accordance with JIS Z 2241: 2011.

The elongation is evaluated with the total elongation at break (El) regulated in JIS Z 2241:2011.

[Hole Expansion Rate λ (%)>(41−10×Sheet Thickness)]

In the steel sheet according to the present embodiment, the hole expansion rate λ (%) has a value represented by the following formula (2) from the viewpoint of the hole expansibility.

$$\text{Hole expansion rate } \lambda(\%) > (41 - 10 \times \text{sheet thickness}) \quad (2)$$

In the formula (2), the sheet thickness represents a sheet thickness in units of mm.

In addition, the hole expansion rate (λ) is evaluated in accordance with the hole expanding test described in JIS Z 2256: 2010.

[Shape after Hole Expansion being Nearly Circular]

In the steel sheet according to the present embodiment, residual austenite is stabilized, whereby the anisotropy of distortability is small. Therefore, in the steel sheet according to the present embodiment, the shape after hole expansion is nearly circular. The circularity in the present embodiment is evaluated by the following procedure. A hole expanding test method described in JIS Z 2256: 2010 is performed on the steel sheet according to the present embodiment, and a test piece after hole expansion is captured at a magnification of twice from immediately above. From the captured image, an area A0 of the shape after hole expansion is measured with image analysis processing software, furthermore, an area A1 of the circumscribed circle of this shape after hole expansion or a circle having the major axis of the shape as the diameter is obtained, and a shape for which a value obtained by dividing A0 by A1 is 0.80 or more is defined as "the shape after hole expansion being nearly circular" in the present embodiment.

Next, a manufacturing method of a steel sheet according to the present embodiment will be described.

The manufacturing method of a steel sheet according to the present embodiment has a hot rolling step of heating a slab having the chemical composition according to the present embodiment at 1150° C. or higher for one hour or longer and hot-rolling the slab to produce a hot-rolled steel sheet in which prior austenite grain diameters are less than 30 μm, a first cooling step of cooling the hot-rolled steel sheet to a temperature range of 800° C. or lower within three seconds from an end of the hot rolling step, a coiling step of cooling the hot-rolled steel sheet after the first cooling step to a temperature range of 300° C. or lower at an average cooling rate of 30° C./s or faster and coiling the hot-rolled steel sheet, a cold rolling step of cold-rolling the hot-rolled steel sheet after the coiling step at a rolling reduction of 0.10% to 30% to produce a cold-rolled steel sheet, an annealing step of heating the cold-rolled steel sheet in a temperature range of 480° C. to Ac1 at an average heating rate of 0.5 to 1.5° C./s and soaking the cold-rolled steel sheet in a temperature range of Ac1 to Ac3, a second cooling step of cooling the cold-rolled steel sheet after the soaking at an average cooling rate of 4° C./s or faster, and a temperature retention step of retaining the cold-rolled steel sheet after the second cooling step at 300° C. to 480° C. for 10 seconds or longer.

Hereinafter, conditions for each step will be described.

[Hot Rolling Step]

A slab having the chemical composition in the present embodiment is heated before hot rolling. The heating temperature of the slab is set to 1150° C. or higher in order to sufficiently form solid solutions of carbides or the like containing V, Ti and Nb. In a case where it is not possible to sufficiently form the solid solutions of the carbides, the carbides are precipitated during hot rolling and become coarse, and it is not possible to precipitate fine carbides at a desired number density. The heating temperature of the slab may be 1200° C. or higher. The upper limit value of the heating temperature is not particularly regulated and, generally, may be 1300° C. or lower or 1250° C. or lower. In addition, the retention time at the heating temperature is set to one hour (60 minutes) or longer in order to make up to the slab center portion reach a predetermined temperature and to sufficiently form solid solutions of carbides formed in a casting stage. The upper limit is not particularly regulated, but is preferably 180 minutes or shorter and more preferably 120 minutes or shorter in order to suppress an excessive scale loss. From the viewpoint of the manufacturability, the slab that is used is preferably cast by a continuous casting method, but may also be cast by an ingot-making method or a thin slab casting method.

In the hot rolling step, the slab having the above-described chemical composition is hot-rolled to produce a hot-rolled steel sheet in which the prior austenite grain diameters are less than 30 μm and the precipitation of carbides is suppressed. This hot rolling step includes a rough rolling step and a finish rolling step of continuously passing the slab through a plurality of rolling stands to perform rolling.

When the prior austenite grain diameters in the hot-rolled steel sheet are set to less than 30 μm, it is possible to suppress austenite grains transformed in the following annealing step being coupled together to form massive austenite. When the coupling into massive austenite is suppressed, it is possible to increase the aspect ratios of residual austenite to 3.0 or more. The prior austenite grain diameters in the hot-rolled steel sheet can be measured by Nital-corroding an observed section and observing the structure with an optical microscope at a magnification of 100 to 500 times in a cross section that is along the rolling direction of the steel sheet and perpendicular to the sheet surface. The area of each γ grain is measured by image processing, and an equivalent circle diameter is regarded as the grain diameter.

<Finish Rolling Step>

The finish rolling step may be performed in four or more stages. Hereinafter, an example of the conditions for the finish rolling step preferable for setting the prior austenite grain diameters in the hot-rolled steel sheet to less than 30 μm will be described. In the following example, a case where the number of rolling stands is four or more will be described.

Rolling Start Temperature in Rolling Stand Third from Final of Rolling Stands: 850° C. to 1000° C.

The finish rolling start temperature (entrance temperature) in the rolling stand third from the final of the rolling stands upstream (the third rolling stand from the back) is set to 850° C. or higher. This is preferable since it is possible to suppress the precipitation of carbides in austenite. On the other hand, when the finish rolling start temperature in the third rolling stand is set to 1000° C. or lower, it is possible to suppress the coarsening of prior austenite grains, which is preferable.

Here, the rolling stand third from the finish rolling stand upstream refers to, for example, the fifth rolling stand from the upstream side in a case where continuous rolling is performed with seven rolling stands. In addition, the rolling stand fourth from the finish rolling stand upstream refers to, for example, the fourth rolling stand from the upstream side in a case where continuous rolling is performed with seven rolling stands.

Rolling Reduction in Each of Three Last Rolling Stands in Finish Rolling: Larger than 10%

In the finish rolling step, the slab is continuously passed through the plurality of rolling stands to be rolled. At this time, the rolling is preferably performed with the rolling reduction in each of the three last rolling stands set to larger than 10%. Here, rolling in the three last rolling stands means rolling using three rolling stands on the downstream side, including the final stand. For example, in a case where continuous rolling is performed with seven rolling stands, the rolling in the three last rolling stands means rolling in the fifth to seventh rolling stands (three stands in total) from the upstream side. When the rolling reduction in each of the three last rolling stands is set to larger than 10%, sufficient rolling strain can be introduced, which makes it possible to sufficiently refine austenite grains. The rolling reduction in each of the three last rolling stands in the finish rolling is more preferably set to 20% or larger. The upper limit of the rolling reduction in each of the three last rolling stands in the finish rolling is not particularly limited and may be determined as 40% or smaller from the viewpoint of the manufacturability.

Interpass Time Between Individual Rolling Stands in Three Last Rolling Stands in Finish Rolling: 3.0 Seconds or Shorter The interpass time of the slab between the individual rolling stands in the three last rolling stands in the finish rolling step (the passing time of the slab) is preferably 3.0 seconds or shorter. In such a case, recovery and recrystallization between passes are suppressed, and it becomes easy to sufficiently accumulate strain. In addition, it is easy to suppress the precipitation of alloy carbides between the passes. The interpass time between the individual rolling stands is preferably set to 2.0 seconds or shorter. The lower limit of the interpass time between the individual rolling stands is not particularly limited, but is preferably as short as possible and is ideally 0 seconds, but may be determined as 0.1 seconds or longer in consideration of the performance of the rolling stands. The interpass times between the individual rolling stands in the three last rolling stands in the finish rolling step are each preferably 3.0 seconds or shorter. In other words, among the interpass times between the individual rolling stands in the three last rolling stands in the finish rolling step, the longest interpass time (maximum value) needs to be 3.0 seconds or shorter.

$(T_n - T_{n+1})$ that is Difference Between Exit Temperature $T_n$ of $n^{th}$ Rolling Stand and Entrance Temperature $T_{n+1}$ of $(n+1)^{th}$ Rolling Stand of Four Last Rolling Stands in Finish Rolling: 10° C. or More Strain can be preferably accumulated by controlling $(T_n - T_{n+1})$ that is the difference between the exit temperature $T_n$ of the $n^{th}$ rolling stand and the entrance temperature $T_{n+1}$ of the $(n+1)^{th}$ rolling stand on the downstream side of the four last rolling stands in finish rolling. When $(T_n - T_{n+1})$ is set to 10° C. or more, recovery and recrystallization between the passes are suppressed, and it is possible to sufficiently accumulate strain in the finish rolling step, which is preferable. $(T_n - T_{n+1})$ is more preferably 13° C. or more. "Entrance temperature" and "exit temperature" in the present embodiment are both the temperatures of the surface of the hot-rolled steel sheet that is passed through each rolling stand measured with a non-contact type thermometer. The non-contact type thermometer may be, for example, a radiation-type thermometer that measures temperatures from radiance with measurement wavelength(s) of a single color or two or more colors, and the path of the measurement wavelength reaching an optical receiver from the surface of the steel sheet may be the atmosphere or in water (water column).

Here, the $(n+1)^{th}$ rolling stand of the four last rolling stands refers to a rolling stand adjacent to the downstream side (in the conveyance direction of the steel sheet) of the $n^{th}$ rolling stand.

In addition, in the rolling in the four last rolling stands during the finish rolling of the present embodiment, it is preferable that the temperature of the steel sheet decreases as the hot-rolled steel sheet moves from the first stand toward the final stand.

In the present embodiment, a facility for increasing $(T_n - T_{n+1})$ is not limited. Industrially, it is preferable to use a cooling apparatus such as a water sprayer capable of controlling the amount of water. For example, a water spraying apparatus may be disposed between conveyance rollers that convey the hot-rolled steel sheet.

[First Cooling Step]

The steel sheet hot-rolled as described above (hereinafter, referred to as the hot-rolled steel sheet in some cases) is cooled to a temperature range of 800° C. or lower within 3.0 seconds from the end of the hot rolling step (first cooling step). That is, the time taken for the hot-rolled steel sheet to be cooled to a temperature range of 800° C. or lower from the end of the hot rolling step is set to 3.0 seconds or shorter. The time taken for cooling is preferably 2.0 seconds or shorter. In the present embodiment, the hot-rolled steel sheet is preferably cooled to the above-described temperature range within 3.0 seconds without performing a retention step of retaining the hot-rolled steel sheet at a certain temperature after hot rolling. This first cooling step makes it possible to suppress the formation of carbides.

In addition, the lower limit of the time taken until the hot-rolled steel sheet begins to be rapidly cooled toward the temperature range of 800° C. or lower after the end of the hot rolling step is not particularly limited, but is ideally 0 seconds. That is, the first cooling step is preferably performed immediately after the end of the hot rolling step.

[Coiling Step]

In the manufacturing method of a steel sheet according to the present embodiment, the hot-rolled steel sheet after the first cooling step is cooled to a temperature of 300° C. or lower at an average cooling rate of 30° C./s or faster and coiled (coiling step).

When the average cooling rate is set to 30° C./s or faster, and furthermore, the coiling temperature is set to 300° C. or lower, it is possible to obtain a full hard structure (low temperature transformation structure), which acts as the origin of a needle-like structure, by suppressing ferritic transformation or pearlitic transformation while suppressing the precipitation of carbides. In a case where the coiling temperature is higher than 300° C., the formation of ferrite and pearlite, which have a massive microstructural morphology, is caused, and there is a concern that it may become difficult to obtain a needle-like structure, which is not preferable. Therefore, in the present embodiment, the coiling temperature is set to 300° C. or lower and preferably set to 250° C. or lower. In addition, in a case where the average cooling rate after the first cooling step is slower than 30° C./s, similarly, there is a concern that the formation of ferrite and pearlite, which have a massive microstructural morphology, may be caused. Therefore, the average cooling rate is set to 30° C./s or faster and is preferably 40° C./s or faster and more preferably 50° C./s or faster. The upper limit of the average cooling rate is not particularly limited, but may be set to 100° C./s or slower from the viewpoint of the manufacturability. In addition, at a temperature lower than 300° C., since the formation of a precipitate does not proceed, the average cooling rate is not limited.

[Cold Rolling Step]

Next, the hot-rolled steel sheet after the coiling step is pickled and cold-rolled at a rolling reduction of 0.10% to 30% to produce a cold-rolled steel sheet.

The pickling is a step for removing an oxide on the surface of the hot-rolled steel sheet, and the number of times of pickling may be once or a plurality of times.

Cold rolling imparts strain and increases the precipitation sites of carbides. In order to obtain this effect, the rolling reduction of cold rolling is set to 0.1% or more. The rolling reduction is preferably 5% or more and more preferably 10% or more.

In a case where the rolling reduction of cold rolling is more than 30%, recrystallization proceeds during heating for annealing, and imparted strain disappears, which is not preferable. For these reasons, the rolling reduction of cold rolling is set to 30% or less. The rolling reduction is preferably 25% or less and more preferably 20% or less.

[Annealing Step]

In the annealing step, the cold-rolled steel sheet is heated to a temperature range of 480° C. to Ac1 at an average heating rate of 0.5 to 1.5° C./s (hereinafter, referred to as the annealing heating step in some cases) and then soaked in a temperature range of Ac1 to Ac3 (hereinafter, referred to as the soaking step in some cases).

<Annealing Heating Step>

In the annealing heating step, the cold-rolled steel sheet is heated to a temperature range of 480° C. to Ac1 at an average heating rate of 0.5 to 1.5° C./s in order to precipitate fine carbides such as VC, TiC and NbC in tempered martensite.

When the average heating rate in the temperature range of 480° C. to Ac1 is set to 0.5 to 1.5° C./s, it is possible to precipitate carbides in a sufficient quantity in tempered martensite. Furthermore, when the average heating rate is set within the above-described range, it is possible to grow the precipitated carbides up to preferable sizes for suppressing strain-induced transformation. The average heating rate in the temperature range of 480° C. to Ac1 is preferably 1.4° C./s or slower and more preferably 1.3° C./s or slower. The average heating rate in the temperature range of 480° C. to Ac1 is preferably 0.6° C./s or faster and more preferably 0.7° C./s or faster.

<Soaking Step>

In the soaking step, the cold-rolled steel sheet after the annealing heating step is soaked within a temperature range of the Ac1 point to the Ac3 point.

When the cold-rolled steel sheet is soaked under such a condition, needle-like austenite is formed along laths of tempered martensite. The formed austenite contains the fine carbides precipitated in the annealing heating step. The soaking temperature after the annealing heating step is preferably (Ac1 point+30° C.) or higher and more preferably (Ac1 point+40° C.) or higher from the viewpoint of ensuring the volume percentage of residual austenite. In addition, the soaking temperature is preferably (Ac3 point−5° C.) or lower and more preferably (Ac3 point−10° C.) or lower from the viewpoint of stably forming needle-like austenite along the laths of tempered martensite.

A specific soaking temperature can be adjusted as appropriate based on the Ac1 point and the Ac3 point represented by the following formulae in consideration of the proportions of desired metallurgical structures.

$$Ac1=723-10.7Mn-16.9Ni+29.1Si+16.9Cr+290As+6.38W \quad \text{(Formula 3)}$$

$$Ac3=910-2034C+44.7Si-30Mn+700P-20Cu-15.2Ni-11Cr+31.5Mo+400Ti+104V+120Al \quad \text{(Formula 4)}$$

Here, C, Si, Mn, P, Cu, Ni, Cr, Mo, Ti, V and Al in (Formula 3) and (Formula 4) are each the amount [mass %] of each element in steel.

The soaking time in the soaking step is not particularly limited and may be set to 5 seconds to 500 seconds. The soaking time may be determined as 300 seconds or shorter from the viewpoint of suppressing the coarsening of ferrite and austenite during soaking.

The temperature of the steel sheet in the soaking step does not need to be constant. The temperature of the steel sheet in the soaking step may be changed within a temperature range of the Ac1 point to the Ac3 point as long as desired structure proportions can be obtained.

<Cooling Step after Annealing (Second Cooling Step)>

In the second cooling step, the cold-rolled steel sheet after the soaking step is cooled at an average cooling rate of 4° C./s or faster. Cooling under a such a condition makes it possible to suppress ferritic transformation during cooling. In addition, it is possible to obtain martensite and residual austenite in a desired quantity in the final structure. In a case where the average cooling rate in the second cooling step is slower than 4° C./s, there is a concern that it may be impossible to sufficiently suppress ferritic transformation during cooling. As a result, it is not possible to obtain martensite and residual austenite in a desired quantity in the final structure, and thus there is a concern that the proportion of the remainder in microstructure such as pearlite may become excessively large. Due to these facts, the average cooling rate in the second cooling step is preferably 8° C./s or faster and more preferably 10° C./s or faster. The upper limit value of the average cooling rate in the second cooling step is not particularly limited and may be set to 100° C./s or slower.

<Temperature Retention Step>

In the temperature retention step, the cold-rolled steel sheet after the second cooling step is retained in a temperature range of 300° C. to 480° C. for 10 seconds or longer. The temperature of the cold-rolled steel sheet may be increased or decreased as appropriate in order to set the cold-rolled steel sheet after the second cooling step to a predetermined retention temperature.

When the retention time is shorter than 10 seconds, carbon does not sufficiently concentrate in untransformed austenite. When the retention time in the temperature range is set to 10 seconds or longer, it is possible to ensure a desired amount of residual austenite after final cooling by increasing the carbon concentration in austenite. In order to stably obtain the above-described effect, the retention time is preferably set to 100 seconds or longer. There is no need to limit the upper limit of the retention time, but the retention time may be set to 1000 seconds or shorter since an excessively long retention time degrades the productivity.

In a case where the retention temperature is lower than 300° C., a desired amount of residual austenite cannot be obtained, which is not preferable. Therefore, the reheating temperature is set to 300° C. or higher and is preferably 350° C. or higher. In addition, in a case where the retention temperature is higher than 480° C., residual austenite decomposes into ferrite and cementite, which is not preferable. Therefore, the retention temperature is set to 480° C. or lower and is preferably 450° C. or lower.

The cold-rolled steel sheet after the temperature retention step may be cooled to the Ms point or lower at an average cooling rate of 1° C./s or faster in order to stably obtain a desired metallurgical structure.

A hot-dip galvanizing step or an alloying step may be performed on the cold-rolled steel sheet in the middle of the cooling step after annealing (the second cooling step), in the middle of the temperature retention step (bainitic transformation step) and after the temperature retention step (bainitic transformation step). In this case, a method for hot-dip galvanizing or a method for alloying is not particularly limited, and a normal method can be used. As the method for hot-dip galvanizing, for example, a method in which cooling is stopped in a temperature range of (zinc plating bath temperature−40°) C to (zinc plating bath temperature+50°) C in the middle of the second cooling step and the steel sheet is immersed in a hot-dip galvanizing bath with the temperature of the steel sheet at the time of being immersed in the plating bath controlled to be in this temperature range, thereby forming hot-dip galvanizing is an exemplary example. In addition, as the method for alloying, for example, a method in which a hot-dip galvanizing is alloyed in a temperature range of 300° C. to 500° C. is an exemplary example.

EXAMPLES

The present invention will be described more specifically with reference to examples.

<Manufacturing Method>

Slabs having a chemical composition shown in Table 1 were cast. A hot rolling step was performed on the cast slabs under conditions shown in Table 2 up to a sheet thickness of 2.8 mm. After hot rolling, a first cooling step, a coiling step, a cold rolling step, an annealing step, a second cooling step and a temperature retention step were performed on the hot-rolled steel sheets under conditions shown in Table 3. After that, in order to stably obtain desired metallurgical structures, the cold-rolled steel sheets were cooled to the Ms point or lower at an average cooling rate of 1° C./s or faster, thereby obtaining final steel sheets.

TABLE 1

Chemical composition (mass %)/ remainder is Fe and impurities

| Kind of steel | C | Si | Al | Mn | V | Ti | Nb | V + Ti + Nb | P | S | N | O | Act1 Point | Act3 point | Others |
|---|---|---|---|---|---|---|---|---|---|---|---|---|---|---|---|
| A | 0.25 | 1.4 | 0.2 | 2.4 | 0.060 | 0.04 | 0.00 | 0.100 | 0.0016 | 0.0166 | 0.0053 | 0.0017 | 738 | 846 | |
| B | 0.21 | 1.7 | 0.4 | 1.1 | 0.110 | 0.01 | 0.01 | 0.130 | 0.0011 | 0.0013 | 0.0087 | 0.0026 | 761 | 925 | |
| C | 0.30 | 0.6 | 0.2 | 2.4 | 0.070 | 0.00 | 0.06 | 0.130 | 0.0010 | 0.0017 | 0.0023 | 0.0010 | 715 | 782 | |
| D | 0.26 | 1.3 | 0.03 | 2.8 | 0.000 | 0.04 | 0.06 | 0.100 | 0.0032 | 0.0023 | 0.0035 | 0.0018 | 731 | 802 | |
| E | 0.32 | 1.6 | 0.8 | 0.2 | 0.000 | 0.00 | 0.05 | 0.050 | 0.0024 | 0.0015 | 0.0136 | 0.0026 | 767 | 953 | |
| F | 0.35 | 0.7 | 0.4 | 3.9 | 0.000 | 0.07 | 0.00 | 0.070 | 0.0021 | 0.0015 | 0.0018 | 0.0022 | 702 | 783 | |
| G | 0.23 | 1.2 | 0.2 | 0.4 | 0.140 | 0.00 | 0.00 | 0.140 | 0.0081 | 0.0009 | 0.0020 | 0.0009 | 754 | 895 | |
| H | 0.29 | 0.9 | 0.3 | 3.6 | 0.040 | 0.09 | 0.00 | 0.130 | 0.0011 | 0.0016 | 0.0153 | 0.0020 | 711 | 813 | |
| I | 0.33 | 2.0 | 0.1 | 1.6 | 0.020 | 0.00 | 0.09 | 0.110 | 0.0037 | 0.0082 | 0.0027 | 0.0171 | 764 | 853 | |
| K | 0.31 | 1.0 | 0.2 | 3.2 | 0.010 | 0.01 | 0.02 | 0.040 | 0.0165 | 0.0128 | 0.0015 | 0.0011 | 718 | 783 | |
| L | 0.22 | 1.1 | 0.5 | 0.7 | 0.050 | 0.07 | 0.02 | 0.140 | 0.0018 | 0.0020 | 0.0013 | 0.0128 | 748 | 937 | |
| M | 0.25 | 1.4 | 0.6 | 0.3 | 0.000 | 0.05 | 0.04 | 0.090 | 0.0017 | 0.0023 | 0.0019 | 0.0091 | 761 | 959 | 0.002B |
| N | 0.34 | 0.8 | 0.8 | 1.5 | 0.020 | 0.00 | 0.04 | 0.060 | 0.0049 | 0.0028 | 0.0017 | 0.0017 | 730 | 885 | 0.052Mo + 0.001B |
| O | 0.28 | 1.5 | 0.3 | 0.9 | 0.050 | 0.03 | 0.00 | 0.080 | 0.0127 | 0.0013 | 0.0171 | 0.0019 | 758 | 901 | 0.055Cr + 0.001B |
| P | 0.21 | 0.7 | 0.5 | 1.2 | 0.050 | 0.07 | 0.00 | 0.120 | 0.0018 | 0.0017 | 0.0013 | 0.0151 | 731 | 902 | 0.061Mo + 0.052Cr |
| Q | 0.25 | 1.5 | 0.1 | 2.5 | 0.100 | 0.00 | 0.03 | 0.130 | 0.0017 | 0.0054 | 0.0019 | 0.0011 | 739 | 816 | 0.043Ni + 0.11Cu + 0.010W + 0.081Ta + 0.009Sn + 0.034Co |
| R | 0.37 | 1.9 | 0.7 | 3.2 | 0.100 | 0.01 | 0.01 | 0.120 | 0.0012 | 0.0020 | 0.0018 | 0.0032 | 746 | 877 | 0.003Sb + 0.006As |
| S | 0.27 | 1.8 | 0.9 | 0.2 | 0.000 | 0.02 | 0.08 | 0.100 | 0.0151 | 0.0032 | 0.0028 | 0.0026 | 773 | 1006 | 0.007Mg + 0.013Ca |
| T | 0.28 | 1.2 | 0.2 | 0.6 | 0.050 | 0.00 | 0.02 | 0.070 | 0.0025 | 0.0152 | 0.0013 | 0.0054 | 752 | 874 | 0.003Y + 0.0052Zr + 0.004La |
| U | 0.38 | 1.8 | 0.9 | 2.4 | 0.160 | 0.00 | 0.00 | 0.160 | 0.0015 | 0.0023 | 0.0052 | 0.0060 | 750 | 916 | |
| V | 0.30 | 1.0 | 0.1 | 1.0 | 0.000 | 0.11 | 0.02 | 0.130 | 0.0025 | 0.0018 | 0.0012 | 0.0011 | 741 | 877 | |
| W | 0.30 | 1.2 | 0.2 | 1.4 | 0.020 | 0.00 | 0.11 | 0.130 | 0.0029 | 0.0017 | 0.0157 | 0.0028 | 743 | 842 | |
| X | 0.34 | 1.3 | 0.5 | 0.8 | 0.020 | 0.00 | 0.00 | 0.020 | 0.0165 | 0.0016 | 0.0020 | 0.0018 | 752 | 894 | |
| Y | 0.23 | 1.1 | 0.7 | 2.1 | 0.070 | 0.05 | 0.04 | 0.160 | 0.0014 | 0.0052 | 0.0020 | 0.0013 | 733 | 910 | |

TABLE 2

| | | | | Hot rolling step | | | | | | | |
|---|---|---|---|---|---|---|---|---|---|---|---|
| Example No. | Kind of steel | Slab heating temperature (° C.) | Slab retention time (minutes) | Entrance temperature of third rolling stand from back (° C.) | Rolling reduction in third rolling stand from back (%) | Rolling reduction in second rolling stand from back (%) | Rolling reduction in first rolling stand from back (%) | Maximum value of interpass time (seconds) | $T_n - T_{n+1}$ (° C.) | $T_{n+1} - T_{n+2}$ (° C.) | $T_{n+2} - T_{n+3}$ (° C.) | Note |
| 1 | A | 1200 | 90 | 900 | 25 | 25 | 25 | 0.2 | 14 | 12 | 14 | Example |
| 2 | B | 1200 | 60 | 980 | 25 | 25 | 25 | 0.1 | 16 | 23 | 13 | Example |
| 3 | C | 1200 | 60 | 940 | 25 | 25 | 25 | 0.2 | 23 | 14 | 26 | Example |
| 4 | D | 1200 | 90 | 960 | 25 | 25 | 25 | 0.1 | 15 | 11 | 27 | Example |
| 5 | E | 1200 | 90 | 920 | 20 | 20 | 20 | 0.1 | 19 | 16 | 11 | Example |
| 6 | F | 1250 | 60 | 920 | 20 | 20 | 20 | 0.2 | 15 | 11 | 20 | Example |
| 7 | G | 1250 | 90 | 860 | 20 | 20 | 20 | 0.1 | 10 | 11 | 19 | Example |
| 8 | H | 1250 | 60 | 970 | 20 | 20 | 20 | 0.1 | 12 | 15 | 11 | Example |
| 9 | I | 1250 | 60 | 950 | 25 | 25 | 25 | 0.1 | 23 | 12 | 21 | Example |
| 10 | K | 1200 | 60 | 900 | 25 | 20 | 20 | 0.1 | 10 | 15 | 17 | Example |
| 11 | L | 1250 | 60 | 870 | 20 | 30 | 30 | 0.2 | 14 | 26 | 25 | Example |
| 12 | M | 1200 | 90 | 880 | 25 | 25 | 25 | 0.1 | 18 | 18 | 13 | Example |
| 13 | N | 1200 | 90 | 950 | 25 | 25 | 25 | 0.1 | 21 | 17 | 18 | Example |
| 14 | O | 1200 | 60 | 970 | 20 | 20 | 20 | 0.1 | 13 | 18 | 10 | Example |
| 15 | P | 1250 | 60 | 900 | 25 | 25 | 25 | 0.1 | 19 | 14 | 18 | Example |
| 16 | Q | 1250 | 60 | 920 | 20 | 20 | 20 | 0.1 | 20 | 13 | 13 | Example |
| 17 | R | 1250 | 60 | 940 | 20 | 20 | 20 | 0.1 | 10 | 24 | 24 | Example |
| 18 | S | 1250 | 60 | 960 | 20 | 20 | 20 | 0.1 | 13 | 11 | 18 | Example |
| 19 | T | 1250 | 60 | 980 | 20 | 20 | 20 | 0.1 | 14 | 22 | 11 | Example |
| 20 | A | <u>1100</u> | 90 | 900 | 25 | 25 | 25 | 0.1 | 15 | 12 | 10 | Comparative Example |
| 21 | A | 1200 | 50 | 950 | 25 | 25 | 25 | 0.1 | 20 | 15 | 14 | Comparative Example |
| 22 | A | 1200 | 60 | <u>840</u> | 25 | 25 | 25 | 0.1 | 14 | 17 | 20 | Comparative Example |
| 23 | A | 1200 | 60 | <u>1010</u> | 25 | 25 | 25 | 0.1 | 14 | 20 | 11 | Comparative Example |
| 24 | A | 1250 | 60 | 880 | <u>9</u> | 25 | 25 | 0.2 | 12 | 21 | 14 | Comparative Example |
| 25 | A | 1250 | 60 | 900 | 25 | <u>9</u> | 25 | 0.1 | 12 | 15 | 23 | Comparative Example |
| 26 | A | 1250 | 60 | 980 | 25 | 25 | 9 | 0.1 | 10 | 22 | 23 | Comparative Example |
| 27 | A | 1250 | 60 | 940 | 25 | 25 | 25 | <u>4.0</u> | 24 | 10 | 12 | Comparative Example |
| 28 | A | 1250 | 60 | 960 | 25 | 25 | 25 | 0.1 | <u>7</u> | 16 | 22 | Comparative Example |
| 29 | A | 1250 | 60 | 960 | 25 | 25 | 25 | 0.1 | 16 | <u>7</u> | 18 | Comparative Example |
| 30 | A | 1250 | 60 | 960 | 25 | 25 | 25 | 0.1 | 23 | 18 | <u>7</u> | Comparative Example |
| 31 | A | 1250 | 60 | 920 | 25 | 25 | 25 | 0.1 | 17 | 24 | 10 | Comparative Example |
| 32 | A | 1250 | 60 | 860 | 25 | 25 | 25 | 0.1 | 13 | 13 | 23 | Comparative Example |
| 33 | A | 1250 | 60 | 970 | 25 | 25 | 25 | 0.1 | 25 | 16 | 22 | Comparative Example |
| 34 | A | 1200 | 60 | 950 | 25 | 25 | 25 | 0.2 | 14 | 19 | 13 | Comparative Example |
| 35 | A | 1200 | 60 | 900 | 25 | 25 | 25 | 0.1 | 12 | 13 | 18 | Comparative Example |
| 36 | A | 1200 | 60 | 950 | 25 | 25 | 25 | 0.1 | 26 | 14 | 15 | Comparative Example |
| 37 | A | 1200 | 60 | 970 | 25 | 25 | 25 | 0.1 | 17 | 17 | 17 | Comparative Example |
| 38 | A | 1200 | 60 | 900 | 25 | 25 | 25 | 0.1 | 16 | 12 | 16 | Comparative Example |
| 39 | A | 1250 | 60 | 920 | 25 | 25 | 25 | 0.1 | 10 | 11 | 11 | Comparative Example |
| 40 | A | 1250 | 60 | 940 | 25 | 25 | 25 | 0.1 | 27 | 26 | 14 | Comparative Example |
| 41 | A | 1250 | 60 | 900 | 25 | 25 | 25 | 0.1 | 13 | 12 | 18 | Comparative Example |
| 42 | A | 1250 | 60 | 950 | 25 | 25 | 25 | 0.2 | 18 | 21 | 26 | Comparative Example |
| 43 | A | 1250 | 60 | 900 | 25 | 25 | 25 | 0.1 | 19 | 11 | 23 | Comparative Example |
| 44 | <u>U</u> | 1200 | 60 | 880 | 25 | 25 | 25 | 0.1 | 20 | 26 | 23 | Comparative Example |

TABLE 2-continued

| | | | | Hot rolling step | | | | | | | |
|---|---|---|---|---|---|---|---|---|---|---|---|
| Example No. | Kind of steel | Slab heating temperature (° C.) | Slab retention time (minutes) | Entrance temperature of third rolling stand from back (° C.) | Rolling reduction in third rolling stand from back (%) | Rolling reduction in second rolling stand from back (%) | Rolling reduction in first rolling stand from back (%) | Maximum value of interpass time (seconds) | $T_n - T_{n+1}$ (° C.) | $T_{n+1} - T_{n+2}$ (° C.) | $T_{n+2} - T_{n+3}$ (° C.) | Note |
| 45 | V | 1200 | 60 | 950 | 25 | 25 | 25 | 0.1 | 11 | 19 | 12 | Comparative Example |
| 46 | W | 1200 | 60 | 920 | 25 | 25 | 25 | 0.1 | 16 | 12 | 21 | Comparative Example |
| 47 | X | 1250 | 60 | 900 | 25 | 25 | 25 | 0.1 | 19 | 14 | 23 | Comparative Example |
| 48 | Y | 1250 | 60 | 970 | 25 | 25 | 25 | 0.1 | 26 | 15 | 13 | Comparative Example |
| 49 | A | 1250 | 60 | 970 | 25 | 25 | 25 | 0.1 | 25 | 16 | 22 | Comparative Example |

TABLE 3

| Example No. | Kind of steel | First cooling step Time taken for cooling (seconds) | Coiling step Average cooling rate (° C./s) | Coiling step Coiling temperature (° C.) | Cold rolling step Rolling reduction (%) | Annealing step Average heating rate in 480° C. to Ac1 (° C./second) | Annealing step Soaking temperature (° C.) | Second cooling step Average cooling rate (° C./second) | Temperature retention step Retention temperature (° C.) | Temperature retention step Retention time (seconds) | Note |
|---|---|---|---|---|---|---|---|---|---|---|---|
| 1 | A | 0.1 | 55 | 100 | 10 | 1.0 | 830 | 15 | 400 | 360 | Example |
| 2 | B | 0.1 | 55 | 100 | 10 | 1.0 | 880 | 15 | 400 | 360 | Example |
| 3 | C | 0.1 | 55 | 100 | 10 | 1.0 | 760 | 15 | 400 | 360 | Example |
| 4 | D | 0.1 | 55 | 150 | 10 | 1.0 | 800 | 10 | 400 | 360 | Example |
| 5 | E | 0.1 | 55 | 150 | 15 | 0.8 | 910 | 10 | 400 | 360 | Example |
| 6 | F | 0.1 | 55 | 200 | 15 | 0.8 | 760 | 10 | 400 | 360 | Example |
| 7 | G | 1.0 | 60 | 200 | 15 | 0.8 | 880 | 15 | 400 | 360 | Example |
| 8 | H | 0.1 | 60 | 200 | 15 | 0.8 | 805 | 15 | 400 | 360 | Example |
| 9 | I | 0.1 | 60 | 50 | 20 | 1.2 | 830 | 20 | 400 | 360 | Example |
| 10 | K | 0.1 | 55 | 50 | 20 | 1.2 | 780 | 20 | 400 | 360 | Example |
| 11 | L | 0.1 | 55 | 50 | 20 | 1.2 | 880 | 30 | 400 | 360 | Example |
| 12 | M | 0.1 | 55 | 100 | 10 | 1.0 | 910 | 15 | 400 | 360 | Example |
| 13 | N | 0.1 | 55 | 100 | 10 | 1.0 | 880 | 15 | 400 | 360 | Example |
| 14 | O | 0.1 | 55 | 150 | 10 | 1.0 | 870 | 15 | 400 | 360 | Example |
| 15 | P | 0.1 | 55 | 150 | 15 | 0.8 | 840 | 15 | 400 | 360 | Example |
| 16 | Q | 0.1 | 55 | 200 | 15 | 0.8 | 810 | 15 | 400 | 360 | Example |
| 17 | R | 0.1 | 55 | 200 | 15 | 0.8 | 850 | 15 | 400 | 360 | Example |
| 18 | S | 0.1 | 55 | 50 | 20 | 1.2 | 980 | 15 | 400 | 360 | Example |
| 19 | T | 0.1 | 55 | 50 | 20 | 1.2 | 830 | 15 | 400 | 360 | Example |
| 20 | A | 0.1 | 55 | 100 | 10 | 1.0 | 830 | 15 | 400 | 360 | Comparative Example |
| 21 | A | 0.1 | 55 | 100 | 10 | 1.0 | 830 | 15 | 400 | 360 | Comparative Example |
| 22 | A | 0.1 | 55 | 100 | 10 | 1.0 | 830 | 15 | 400 | 360 | Comparative Example |
| 23 | A | 0.1 | 55 | 100 | 10 | 1.0 | 830 | 15 | 400 | 360 | Comparative Example |
| 24 | A | 1.0 | 55 | 100 | 10 | 1.0 | 830 | 15 | 400 | 360 | Comparative Example |
| 25 | A | 0.1 | 55 | 100 | 10 | 1.0 | 830 | 15 | 400 | 360 | Comparative Example |
| 26 | A | 0.1 | 55 | 100 | 10 | 1.0 | 830 | 15 | 400 | 360 | Comparative Example |
| 27 | A | 0.1 | 55 | 100 | 10 | 1.0 | 830 | 15 | 400 | 360 | Comparative Example |
| 28 | A | 0.1 | 55 | 100 | 10 | 1.0 | 830 | 15 | 400 | 360 | Comparative Example |
| 29 | A | 0.1 | 55 | 100 | 10 | 1.0 | 830 | 15 | 400 | 360 | Comparative Example |
| 30 | A | 0.1 | 55 | 100 | 10 | 1.0 | 830 | 15 | 400 | 360 | Comparative Example |

TABLE 3-continued

| | | First cooling step | Coiling step | | Cold rolling step | Annealing step | | Second cooling step | Temperature retention step | | |
|---|---|---|---|---|---|---|---|---|---|---|---|
| Example No. | Kind of steel | Time taken for cooling (seconds) | Average cooling rate (° C./s) | Coiling temperature (° C.) | Rolling reduction (%) | Average heating rate in 480° C. to Ac1 (° C./second) | Soaking temperature (° C.) | Average cooling rate (° C./second) | Retention temperature (° C.) | Retention time (seconds) | Note |
| 31 | A | 5.0 | 55 | 100 | 10 | 1.0 | 830 | 15 | 400 | 360 | Comparative Example |
| 32 | A | 0.1 | 20 | 100 | 10 | 1.0 | 830 | 15 | 400 | 360 | Comparative Example |
| 33 | A | 0.1 | 55 | 310 | 10 | 1.0 | 830 | 15 | 400 | 360 | Comparative Example |
| 34 | A | 0.1 | 55 | 100 | 0 | 1.0 | 830 | 15 | 400 | 360 | Comparative Example |
| 35 | A | 0.1 | 55 | 100 | 40 | 1.0 | 830 | 15 | 400 | 360 | Comparative Example |
| 36 | A | 0.1 | 55 | 100 | 10 | 0.4 | 830 | 15 | 400 | 360 | Comparative Example |
| 37 | A | 0.1 | 55 | 100 | 10 | 1.6 | 830 | 15 | 400 | 360 | Comparative Example |
| 38 | A | 0.1 | 55 | 100 | 10 | 1.0 | 720 | 15 | 400 | 360 | Comparative Example |
| 39 | A | 0.1 | 55 | 100 | 10 | 1.0 | 850 | 15 | 400 | 360 | Comparative Example |
| 40 | A | 0.1 | 55 | 100 | 10 | 1.0 | 830 | 1 | 400 | 360 | Comparative Example |
| 41 | A | 0.1 | 55 | 100 | 10 | 1.0 | 830 | 15 | 280 | 360 | Comparative Example |
| 42 | A | 0.1 | 55 | 100 | 10 | 1.0 | 830 | 15 | 500 | 360 | Comparative Example |
| 43 | A | 0.1 | 55 | 100 | 10 | 1.0 | 830 | 15 | 400 | 9 | Comparative Example |
| 44 | U | 0.1 | 55 | 100 | 10 | 1.0 | 860 | 15 | 400 | 360 | Comparative Example |
| 45 | V | 0.1 | 55 | 100 | 10 | 1.0 | 820 | 15 | 400 | 360 | Comparative Example |
| 46 | W | 0.1 | 55 | 100 | 10 | 1.0 | 810 | 15 | 400 | 360 | Comparative Example |
| 47 | X | 0.1 | 55 | 100 | 10 | 1.0 | 840 | 15 | 400 | 360 | Comparative Example |
| 48 | Y | 0.1 | 55 | 100 | 10 | 1.0 | 890 | 15 | 400 | 360 | Comparative Example |
| 49 | A | 0.1 | 37 | 505 | 10 | 1.0 | 830 | 15 | 400 | 360 | Comparative Example |

<Measurement of Metallurgical Structure>

Test pieces for scanning electron microscopic (SEM) observation were collected from the obtained final steel sheets (annealed steel sheets), and longitudinal sections parallel to the rolling direction were polished. After that, the metallurgical structures at the ¼ positions of the sheet thicknesses were observed, and the area ratio of each structure was measured by image processing. The volume percentage of each structure was shown in Table 4. "Remainder in microstructure" shown in Table 4 refers to structures other than ferrite, martensite, bainite and residual austenite. In addition, the metallurgical structures of the present examples were confirmed by a method in which a field emission-type scanning electron microscope was used, and the remainder in microstructure was found out to be formed of pearlite.

The volume percentage of residual austenite (residue γ) was calculated by measuring diffraction intensities using X-rays. In the measurement using X-rays, a portion from the sheet surface of a sample to a depth ¼ position was removed by mechanical polishing and chemical polishing, and the integrated intensity ratio of the diffraction peaks of (200) and (211) of a bcc phase and (200), (220) and (311) of an fcc phase was obtained using MoKα rays at a sheet thickness ¼ position. The microstructural fraction of residual austenite was calculated from the obtained intensity ratio. At that time, a five-peak method, which is a general calculation method, was used.

The area ratio of fresh martensite was obtained by the following procedure. An observed section of the sample was etched with a LePera solution, and a secondary electron image of a 100 μm×100 μm region in the sheet thickness ⅛ to ⅜ range, in which the sheet thickness ¼ was centered, obtained with a field emission scanning electron microscope (FE-SEM) was observed at a magnification of 3000 times. Since fresh martensite and residual austenite are not corroded by LePera corrosion, the area ratio of uncorroded regions is the total area ratio of fresh martensite and residual austenite. The area ratio of fresh martensite was calculated by subtracting the volume percentage of residual austenite measured with X-rays from the area ratio of the uncorroded regions.

The area ratios of ferrite, bainite and tempered martensite were determined from a secondary electron image obtained by observing the ⅛ to ⅜ sheet thickness range (that is, the sheet thickness range in which the ¼ sheet thickness position was centered) with FE-SEM. In this FE-SEM observation, the sample was collected such that a sheet thickness cross section of the steel sheet parallel to the rolling direction became the observed section, and polishing and Nital etching were performed on this observed section. The same region as the region observed by the LePera corrosion was confirmed by leaving a plurality of indentations around the region observed by the LePera corrosion. Ferrite is a structure in which the insides of grain boundaries appear in uniform contrast. Bainite is a collection of lath-shaped crystal grains and is a structure in which iron-based carbides having a major axis of 20 nm or more are not contained or a structure in which iron-based carbides having a major axis of 20 nm or more are contained and the carbides belong to a single variant, that is, a group of iron-based carbides elongated in the same direction. Here, the group of iron-based carbides elongated in the same direction refers to a group in which the difference in the elongation direction in the group of iron-based carbides was 5° or less. Tempered martensite was distinguished from bainite due to the fact that cementite in the structure has a plurality of variants.

The area ratio of martensite was obtained by combining the area ratio of fresh martensite and the area ratio of tempered martensite specified by the above-described method.

The proportion of residual austenite having an aspect ratio of 3 or more in all residual austenite was obtained by an EBSD analysis method in which FE-SEM is used. Specifically, a test piece in which a sheet thickness cross section of the steel sheet parallel to the rolling direction was used as an observed section was collected, the observed section of the test piece was polished, then, a strain-influenced layer was removed by electrolytic polishing, and EBSD analysis was performed on an area of $2.0 \times 10^{-8}$ m$^2$ or more in total at one or more visual fields in a region of ⅛t (t: sheet thickness) to ⅜t (t: sheet thickness) from the surface of the sheet thickness at measurement steps set to 0.2 μm.

A residual austenite map was produced from measured data, residual austenite having an aspect ratio of 3 or more was extracted, and the area fraction of residual austenite having an aspect ratio of 3 or more was obtained.

The number density of the carbides having a grain diameter of 8 to 40 nm (fine carbides) in residual austenite (residue γ) was measured as described below.

First, an extraction replica sample of a circular region having a diameter of 3.0 mm at a ¼ position from the surface of the steel sheet was observed at three visual fields using a transmission electron microscope (TEM) at a magnification of 100000 times, a precipitate from which a corresponding alloy carbide-forming element was detected by the energy-dispersive X-ray spectroscopy (EDX) in each visual field was regarded as a carbide, the area of each precipitate was obtained using an image analysis apparatus and converted into a circle-converted diameter. Next, a value obtained by calculating the number of carbides having a circle-converted diameter of 8 nm or more and 40 nm or less and dividing this by the area of the observed visual field was regarded as the number density of carbides in each visual field, this was performed on the three visual fields, and the obtained arithmetic mean was determined as the number density of the carbides having a circle-converted diameter of 8 to 40 nm.

<Measurement of Characteristics>
(Tensile Strength)

The tensile strength TS was measured by collecting a JIS No. 5 tensile test piece from the steel sheet in a direction perpendicular to the rolling direction and performing a tensile test in accordance with JIS Z 2241: 2011. A case where the tensile strength TS (unit: MPa) was 980 MPa or more was regarded as pass.

The measurement results of the tensile strength were shown in Table 5.

(Elongation)

The elongation was measured by collecting a JIS No. 5 tensile test piece described in JIS Z 2201 from the steel sheet in a direction perpendicular to the rolling direction and performing a tensile test in accordance with JIS Z 2241: 2011. A case where the elongation (%) was a larger value than (49−0.03×TS) was regarded as pass. The measurement results of the elongation and the values of (49−0.03×TS) were shown in Table 5.

(Hole Expansion Rate λ)

The hole expansion rate λ of the steel sheet was evaluated according to the hole expanding test method described in JIS Z 2256: 2010. A sheet thickness t (mm) necessary to calculate a numerical value (criterion value) that served as an evaluation criterion of the hole expansion rate λ was obtained by the following method.

First, the sheet thickness (mm) was measured with a caliper at each of three points (a ¼ position, a ½ position and a ¾ position) in the width direction of the steel sheet, and the arithmetic mean thereof was regarded as the sheet thickness t (mm).

In the present examples, the criterion value that served as the evaluation criterion of the hole expansion rate λ was determined as (41−10×sheet thickness t). That is, a case where the hole expansion rate λ was a value larger than (41−10×sheet thickness t) was regarded as pass. The hole expansion rate λ (%) and the value of (41−10×sheet thickness t) were shown in Table 5.

(Shape after Hole Expansion: Anisotropy of Distortability)

The shape after the above-described hole expanding test was performed was evaluated by the following method.

First, a test piece after hole expansion was captured from immediately above. From the captured image, an area A0 of the shape of a hole after hole expansion was measured with image analysis processing software. Furthermore, an area A1 of the circumscribed circle of the shape after hole expansion was obtained, and a value (A0/A1) was obtained by dividing A0 by A1. A case where A0/A1 was 0.80 or more was regarded as pass as a steel sheet being excellent in terms of the anisotropy of distortability. The values of A0/A1 were shown in Table 5. "Circumscribed circle" mentioned herein means a circle having the major axis of the shape of a hole as the diameter, where the major axis is a straight line having the maximum length among line segments that are straight lines passing through the center of the hole and are composed of two points intersecting with the brink of the hole shape.

TABLE 4

| Example No. | Kind of steel | Metallurgical structure (volume percentage (%)) Martensite | Ferrite + bainite | Residual γ | Remainder in microstructure | Proportion of residual γ having aspect ratio of 3 or more [%] | Number density of fine carbides in residual γ [carbides/μm²] | Note |
|---|---|---|---|---|---|---|---|---|
| 1 | A | 62 | 31 | 7 | 0 | 87 | 10 | Example |
| 2 | B | 58 | 35 | 4 | 3 | 99 | 8 | Example |
| 3 | C | 41 | 46 | 11 | 2 | 89 | 7 | Example |
| 4 | D | 76 | 16 | 5 | 3 | 97 | 9 | Example |
| 5 | E | 57 | 34 | 8 | 1 | 81 | 7 | Example |
| 6 | F | 43 | 42 | 14 | 1 | 85 | 8 | Example |
| 7 | G | 72 | 22 | 4 | 2 | 91 | 10 | Example |
| 8 | H | 72 | 20 | 6 | 2 | 81 | 6 | Example |
| 9 | I | 57 | 35 | 7 | 1 | 82 | 6 | Example |
| 10 | K | 65 | 23 | 9 | 3 | 95 | 9 | Example |
| 11 | L | 52 | 43 | 5 | 0 | 81 | 10 | Example |
| 12 | M | 60 | 33 | 5 | 2 | 90 | 11 | Example |
| 13 | N | 80 | 13 | 5 | 2 | 91 | 9 | Example |
| 14 | O | 46 | 42 | 11 | 1 | 81 | 9 | Example |
| 15 | P | 47 | 47 | 5 | 1 | 97 | 7 | Example |
| 16 | Q | 70 | 23 | 5 | 2 | 84 | 11 | Example |
| 17 | R | 54 | 32 | 11 | 3 | 88 | 9 | Example |
| 18 | S | 68 | 24 | 6 | 2 | 98 | 9 | Example |
| 19 | T | 42 | 48 | 9 | 1 | 99 | 6 | Example |
| 20 | A | 62 | 29 | 7 | 2 | 91 | <u>0</u> | Comparative Example |
| 21 | A | 63 | 28 | 6 | 3 | 98 | <u>0</u> | Comparative Example |
| 22 | A | 63 | 30 | 6 | 1 | 82 | <u>4</u> | Comparative Example |
| 23 | A | 63 | 29 | 6 | 2 | 72 | <u>7</u> | Comparative Example |
| 24 | A | 63 | 31 | 6 | 0 | <u>78</u> | 7 | Comparative Example |
| 25 | A | 63 | 30 | 6 | 1 | <u>78</u> | 8 | Comparative Example |
| 26 | A | 63 | 30 | 6 | 1 | <u>75</u> | 7 | Comparative Example |
| 27 | A | 63 | 29 | 6 | 2 | <u>75</u> | 9 | Comparative Example |
| 28 | A | 63 | 29 | 6 | 2 | <u>75</u> | 9 | Comparative Example |
| 29 | A | 63 | 29 | 6 | 2 | <u>72</u> | 9 | Comparative Example |
| 30 | A | 63 | 29 | 6 | 2 | <u>78</u> | 6 | Comparative Example |
| 31 | A | 62 | 28 | 7 | 3 | <u>82</u> | <u>2</u> | Comparative Example |
| 32 | A | 63 | 28 | 6 | 3 | <u>21</u> | <u>3</u> | Comparative Example |
| 33 | A | 63 | 28 | 6 | 3 | <u>71</u> | <u>4</u> | Comparative Example |
| 34 | A | 63 | 28 | 6 | 3 | <u>90</u> | <u>3</u> | Comparative Example |
| 35 | A | 63 | 29 | 6 | 2 | 96 | <u>4</u> | Comparative Example |
| 36 | A | 63 | 28 | 6 | 3 | 97 | <u>2</u> | Comparative Example |
| 37 | A | 63 | 29 | 6 | 2 | 87 | <u>3</u> | Comparative Example |
| 38 | A | <u>0</u> | <u>100</u> | <u>0</u> | 0 | <u>0</u> | <u>0</u> | Comparative Example |
| 39 | A | <u>82</u> | <u>15</u> | <u>2</u> | 1 | <u>0</u> | 6 | Comparative Example |
| 40 | A | 36 | 47 | <u>2</u> | <u>15</u> | <u>75</u> | 7 | Comparative Example |
| 41 | A | <u>79</u> | 17 | <u>2</u> | <u>2</u> | <u>0</u> | <u>4</u> | Comparative Example |
| 42 | A | 64 | 25 | <u>2</u> | <u>9</u> | <u>0</u> | <u>0</u> | Comparative Example |
| 43 | A | 77 | 19 | <u>2</u> | <u>2</u> | 98 | <u>5</u> | Comparative Example |
| 44 | U | 46 | 41 | 11 | 2 | 98 | <u>4</u> | Comparative Example |
| 45 | V | 41 | 49 | 8 | 2 | 98 | <u>1</u> | Comparative Example |
| 46 | W | 58 | 35 | 4 | 3 | 85 | <u>2</u> | Comparative Example |
| 47 | X | 42 | 46 | 11 | 1 | 92 | <u>1</u> | Comparative Example |
| 48 | Y | 56 | 34 | 8 | 2 | 91 | <u>2</u> | Comparative Example |
| 49 | A | 58 | 33 | 5 | 4 | <u>52</u> | 3 | Comparative Example |

TABLE 5

| Example No. | Kind of steel | TS [MPa] | Elongation [%] | 49 − 0.03 × TS | Hole expansion rate λ (%) | 41 − 10 × (sheet thickness t) | A0/A1 | Note |
|---|---|---|---|---|---|---|---|---|
| 1 | A | 1315 | 13 | 10 | 34 | 27 | 0.96 | Example |
| 2 | B | 1073 | 18 | 17 | 32 | 27 | 0.84 | Example |
| 3 | C | 1136 | 16 | 15 | 35 | 27 | 0.94 | Example |
| 4 | D | 1405 | 11 | 7 | 36 | 27 | 0.84 | Example |
| 5 | E | 1166 | 16 | 14 | 34 | 27 | 0.84 | Example |
| 6 | F | 1234 | 13 | 12 | 36 | 27 | 0.90 | Example |
| 7 | G | 1210 | 14 | 13 | 34 | 27 | 0.88 | Example |
| 8 | H | 1399 | 11 | 7 | 32 | 27 | 0.81 | Example |
| 9 | I | 1208 | 15 | 13 | 33 | 27 | 0.90 | Example |
| 10 | K | 1355 | 12 | 8 | 30 | 27 | 0.90 | Example |
| 11 | L | 1036 | 19 | 18 | 32 | 27 | 0.83 | Example |
| 12 | M | 1139 | 16 | 15 | 30 | 27 | 0.91 | Example |
| 13 | N | 1396 | 12 | 7 | 36 | 27 | 0.84 | Example |
| 14 | O | 1124 | 16 | 15 | 35 | 27 | 0.83 | Example |
| 15 | P | 998 | 21 | 19 | 32 | 27 | 0.87 | Example |

TABLE 5-continued

| Example No. | Kind of steel | TS [MPa] | Elongation [%] | 49 − 0.03 × TS | Hole expansion rate λ (%) | 41 − 10 × (sheet thickness t) | A0/A1 | Note |
|---|---|---|---|---|---|---|---|---|
| 16 | Q | 1398 | 12 | 7 | 28 | 27 | 0.86 | Example |
| 17 | R | 1321 | 14 | 9 | 35 | 27 | 0.85 | Example |
| 18 | S | 1038 | 19 | 18 | 34 | 27 | 0.92 | Example |
| 19 | T | 1043 | 20 | 18 | 34 | 27 | 0.83 | Example |
| 20 | A | 1241 | 13 | 12 | 24 | 27 | 0.68 | Comparative Example |
| 21 | A | 1183 | 15 | 14 | 26 | 27 | 0.79 | Comparative Example |
| 22 | A | 1230 | 13 | 12 | 24 | 27 | 0.76 | Comparative Example |
| 23 | A | 1182 | 15 | 14 | 24 | 27 | 0.76 | Comparative Example |
| 24 | A | 1304 | 13 | 10 | 22 | 27 | 0.70 | Comparative Example |
| 25 | A | 1318 | 13 | 9 | 23 | 27 | 0.78 | Comparative Example |
| 26 | A | 1318 | 13 | 9 | 23 | 27 | 0.70 | Comparative Example |
| 27 | A | 1321 | 13 | 9 | 22 | 27 | 0.79 | Comparative Example |
| 28 | A | 1321 | 13 | 9 | 23 | 27 | 0.70 | Comparative Example |
| 29 | A | 1321 | 13 | 9 | 23 | 27 | 0.78 | Comparative Example |
| 30 | A | 1321 | 13 | 9 | 23 | 27 | 0.71 | Comparative Example |
| 31 | A | 1324 | 13 | 9 | 24 | 27 | 0.76 | Comparative Example |
| 32 | A | 1323 | 13 | 9 | 23 | 27 | 0.76 | Comparative Example |
| 33 | A | 1323 | 13 | 9 | 24 | 27 | 0.73 | Comparative Example |
| 34 | A | 1323 | 13 | 9 | 24 | 27 | 0.67 | Comparative Example |
| 35 | A | 1321 | 13 | 9 | 22 | 27 | 0.75 | Comparative Example |
| 36 | A | 1323 | 13 | 9 | 23 | 27 | 0.74 | Comparative Example |
| 37 | A | 1321 | 13 | 9 | 24 | 27 | 0.77 | Comparative Example |
| 38 | A | 751 | 28 | 26 | 45 | 27 | 0.81 | Comparative Example |
| 39 | A | 1490 | 7 | 4 | 24 | 27 | 0.78 | Comparative Example |
| 40 | A | 1029 | 14 | 18 | 18 | 27 | 0.78 | Comparative Example |
| 41 | A | 1661 | 7 | −1 | 26 | 27 | 0.67 | Comparative Example |
| 42 | A | 1065 | 18 | 17 | 26 | 27 | 0.75 | Comparative Example |
| 43 | A | 1435 | 11 | 6 | 25 | 27 | 0.78 | Comparative Example |
| 44 | U | 1290 | 9 | 10 | 19 | 27 | 0.78 | Comparative Example |
| 45 | V | 1062 | 15 | 17 | 17 | 27 | 0.79 | Comparative Example |
| 46 | W | 1243 | 11 | 12 | 22 | 27 | 0.79 | Comparative Example |
| 47 | X | 1144 | 14 | 15 | 17 | 27 | 0.69 | Comparative Example |
| 48 | Y | 1022 | 16 | 18 | 17 | 27 | 0.67 | Comparative Example |
| 49 | A | 1196 | 12 | 13 | 26 | 27 | 0.68 | Comparative Example |

TABLE 6

| Example No. | Steel sheet temperature during immersion in plating bath (° C.) | Temperature of plating bath (° C.) | Alloying treatment temperature (° C.) | TS [MPa] | Elongation [%] | 49 − 0.03 × TS | Hole expansion rate λ (%) | 41 − 10 × (sheet thickness t) | A0/A1 | Kind of plating | Note |
|---|---|---|---|---|---|---|---|---|---|---|---|
| 50 | 447 | 458 | — | 1135 | 18 | 15.0 | 28 | 27 | 0.83 | GI | Example |
| 51 | 455 | 458 | — | 1124 | 18 | 15.3 | 29 | 27 | 0.86 | GI | Example |
| 52 | 462 | 459 | 472 | 1113 | 19 | 15.6 | 29 | 27 | 0.86 | GA | Example |
| 53 | 468 | 460 | 491 | 1086 | 19 | 16.4 | 29 | 27 | 0.88 | GA | Example |
| 54 | 471 | 462 | 499 | 1076 | 19 | 16.7 | 30 | 27 | 0.89 | GA | Example |

As shown in Table 5, in the present examples according to the present invention, the elongation (%) was values larger than (49−0.03×TS (unit: MPa)), the hole expansion rate λ (%) was values larger than (41−10×sheet thickness (unit: mm)), and the shapes after hole expansion were nearly circular.

In addition, a variety of characteristics were evaluated regarding a case where a plating treatment was performed under conditions shown in Table 6 on a part of a cold-rolled coil (cold-rolled steel sheet) after the cold rolling step produced in the example with Example No. 1. Specifically, first, an annealing step was performed under the same conditions as for Example No. 1, and a temperature retention step was performed at 400° C. for 380 seconds. After that, steel sheets were reheated to be controlled to steel sheet temperatures shown in Table 6, and the steel sheets were immersed in a zinc plating bath. After immersion, hot-dip galvanized steel sheets (GI) or galvannealed steel sheets (GA) were produced by cooling the steel sheets to room temperature in Example Nos. 50 and 51 and by performing an alloying treatment and then cooling the steel sheets to room temperature in Example Nos. 52 to 54. As shown in Table 6, in plated steel sheets on which a hot-dip galvanizing treatment or a hot-dip galvanizing treatment and an alloying treatment were performed as well, the elongation (%) was values larger than (49−0.03×TS (unit: MPa)), the hole expansion rate λ (%) was values larger than (41−10×sheet thickness t (unit: mm)), and the shapes after hole expansion were nearly circular.

On the other hand, in Comparative Example 20 where the slab heating temperature during hot rolling was low, it was not possible to sufficiently form the solid solutions of carbides or the like containing V, Ti and Nb formed in the casting stage, and the carbides were precipitated during hot rolling and became coarse. Therefore, the number densities of carbides having a grain diameter of 8 to 40 nm in residual austenite were not sufficient, and the hole expansibility and the anisotropy of distortability were poor.

In Comparative Example 21 where the retention time at the slab heating temperature during hot rolling was short, the solid solutions of carbides containing V, Ti and Nb formed in the casting stage were not sufficiently formed. Therefore, the number densities of carbides having a grain diameter of 8 to 40 nm in residual austenite were not sufficient, and the hole expansibility and the anisotropy of distortability were poor.

In Comparative Example 22 where the rolling start temperature in the third rolling stand from the finish rolling stand (the entrance temperature of the third rolling stand from the back) was low, it was not possible to suppress the precipitation of carbides in austenite during rolling. Therefore, the number density of carbides having a grain diameter of 8 to 40 nm in residual austenite was not sufficient. Therefore, the hole expansibility and the anisotropy of distortability were poor.

In Comparative Example 23 where the rolling start temperature in the third rolling stand from the finish rolling stand (the entrance temperature of the third rolling stand from the back) was high, it was not possible to sufficiently suppress the coarsening of prior austenite grains, and thus the proportion of residual austenite having an aspect ratio of 3 or more was low. Therefore, the hole expansibility and the anisotropy of distortability were poor.

In Comparative Example 24 where the rolling reduction in the third rolling stand from the final stand (the third rolling stand from the back) among the three last rolling stands for finish rolling was low, Comparative Example 25 where the rolling reduction in the second rolling stand from the back was low, and Comparative Example 26 where the rolling reduction in the first rolling stand from the back (the finish rolling stand) was low, it was not possible to introduce sufficient rolling strain, and it was not possible to sufficiently refine austenite grains. Therefore, the proportion of residual austenite having an aspect ratio of 3 or more was low. Therefore, the hole expansibility and the anisotropy of distortability were poor.

In Comparative Example 27 where, among the interpass times between the individual rolling stands in the three last rolling stands in the finish rolling step, the longest interpass time (maximum value) was outside the scope of the invention, recovery and recrystallization between passes were not suppressed, and it was not possible to sufficiently accumulate strain. Therefore, the proportion of residual austenite having an aspect ratio of 3 or more was low. Therefore, the hole expansibility and the anisotropy of distortability were poor.

In Comparative Examples 28 to 30 where $(T_n - T_{n+1})$ that was the difference between the exit temperature $T_n$ of the $n^{th}$ rolling stand and the entrance temperature $T_{n+1}$ of the $(n+1)^{th}$ rolling stand on the downstream side of the four last rolling stands in finish rolling was less than 10° C., since recovery and recrystallization between passes were not suppressed, and it was not possible to sufficiently accumulate strain, the proportion of residual austenite having an aspect ratio of 3 or more was low. Therefore, the hole expansibility and the anisotropy of distortability were poor.

In Comparative Example 31 where the time taken to cool the hot-rolled steel sheet to a temperature range of 800° C. or lower from the end of the hot rolling step (time taken for cooling) was long, it was not possible to suppress the formation of carbides. Therefore, the number density of carbides having a grain diameter of 8 to 40 nm in residual austenite was not sufficient. Therefore, the hole expansibility and the anisotropy of distortability were poor.

In Comparative Example 32 where the average cooling rate in the coiling step was slow and Comparative Example 33 and Comparative Example 49 where the coiling temperature in the coiling step was higher than 300° C., it was not possible to suppress the precipitation of carbides. As a result, it was not possible to suppress ferritic transformation or pearlitic transformation, and a preferable full hard structure, which acts as the origin of a needle-like structure, could not be obtained. Therefore, the proportion of residual austenite having an aspect ratio of 3 or more was low, and the number density of carbides having a grain diameter of 8 to 40 nm in residual austenite was not sufficient. Therefore, the hole expansibility and the anisotropy of distortability were poor.

In Comparative Example 34 where the cold rolling step was not performed, strain was not imparted, and the precipitation sites of carbides were not increased. Therefore, the number density of carbides having a grain diameter of 8 to 40 nm in residual austenite was not sufficient. Therefore, the hole expansibility and the anisotropy of distortability were poor.

In Comparative Example 35 where the rolling reduction in the cold rolling step was high, recrystallization proceeded during heating for annealing, and imparted strain disappeared. Therefore, the number density of carbides having a grain diameter of 8 to 40 nm in residual austenite was not sufficient. Therefore, the hole expansibility and the anisotropy of distortability were poor.

In Comparative Example 36 where the average heating rate in the annealing step was slow and Comparative Example 37 where the average heating rate was fast, the amount of carbides precipitated was not sufficient, and the carbides did not grow to preferable sizes for suppressing strain-induced transformation. Therefore, the number density of carbides having a grain diameter of 8 to 40 nm in residual austenite was not sufficient. Therefore, the hole expansibility and the anisotropy of distortability were poor.

In Comparative Example 38 where the soaking temperature in the annealing step was low, since residual austenite was not formed, residual austenite having an aspect ratio of 3 or more was not present, and carbides were also not present in residual austenite. Therefore, in Comparative Example 38, the tensile strength was not sufficient.

In Comparative Example 39 where the soaking temperature in the annealing step was high, since needle-like austenite was not formed along laths of tempered martensite, a desired metallurgical structure could not be obtained. Therefore, in Comparative Example 39, the proportion of residual austenite having an aspect ratio of 3 or more was low. Therefore, the hole expansibility and the anisotropy of distortability were poor.

In Comparative Example 40 where the average cooling rate in the cooling step after annealing (second cooling step) was low, since it was not possible to suppress ferritic transformation during cooling, it was not possible to obtain a desired metallurgical structure in the final structure. Therefore, the elongation, the hole expansibility and the anisotropy of distortability were poor.

In Comparative Example 41 where the retention temperature in the temperature retention step was low, the volume percentage of residual austenite was low, the proportion of residual austenite having an aspect ratio of 3 or more was low, and the number density of carbides having a grain diameter of 8 to 40 nm in residual austenite was not sufficient. Therefore, the hole expansibility and the anisotropy of distortability were poor.

In Comparative Example 42 where the retention temperature in the temperature retention step was high, the volume percentage of residual austenite was low, and the volume percentage of the remainder in microstructure was high. Therefore, the proportion of residual austenite having an aspect ratio of 3 or more was low, and the number density of carbides having a grain diameter of 8 to 40 nm in residual austenite was not sufficient. Therefore, the hole expansibility and the anisotropy of distortability were poor.

In Comparative Example 43 where the retention time at the retention temperature in the temperature retention step was short, since carbon did not sufficiently concentrate in untransformed austenite, the volume percentage of residual austenite was low.

In Comparative Example 44 where the V content and V+Ti+Nb were excessive, a number of coarse V carbides were precipitated, and accordingly, the number density of carbides having a grain diameter of 8 to 40 nm in residual austenite was not sufficient. Therefore, the elongation, the hole expansibility and the anisotropy of distortability were poor.

In Comparative Example 45 where the Ti content was excessive, coarse Ti oxides and TiN were formed, in addition, Ti carbides were precipitated in the hot rolling step, these Ti carbides became coarse in the following steps, and accordingly, the number density of carbides having a grain diameter of 8 to 40 nm in residual austenite was not sufficient. Therefore, the elongation, the hole expansibility and the anisotropy of distortability were poor.

In Comparative Example 46 where the Nb content was excessive, Nb carbides were precipitated in the hot rolling step, these Nb carbides became coarse in the following steps, and thus the number density of carbides having a grain diameter of 8 to 40 nm in residual austenite was not sufficient. Therefore, the elongation, the hole expansibility and the anisotropy of distortability were poor.

In Comparative Example 47 where the total amount of V+Ti+Nb was small and Comparative Example 48 where the total amount was large, complex carbides were precipitated during hot rolling, these complex carbides became coarse in the following steps, and accordingly, the number density of carbides having a grain diameter of 8 to 40 nm in residual austenite was not sufficient. Therefore, the elongation, the hole expansibility and the anisotropy of distortability were poor.

What is claimed is:

1. A steel sheet,
wherein a chemical composition contains, by mass %:
C: 0.20% to 0.40%,
Si: 0.5% to 2.0%,
Al: 0.001% to 1.0%,
Mn: 0.1% to 4.0%,
V: 0.150% or less,
Ti: 0.10% or less,
Nb: 0.10% or less,
P: 0.0200% or less,
S: 0.0200% or less,
N: 0.0200% or less,
O: 0.0200% or less,
Ni: 0% to 1.00%,
Mo: 0% to 1.00%,
Cr: 0% to 2.000%,
B: 0% to 0.0100%,
Cu: 0% to 0.500%,
W: 0% to 0.10%,
Ta: 0% to 0.10%,
Sn: 0% to 0.050%,
Co: 0% to 0.50%,
Sb: 0% to 0.050%,
As: 0% to 0.050%,
Mg: 0% to 0.050%,
Ca: 0% to 0.040%,
Y: 0% to 0.050%,
Zr: 0% to 0.050%, and
La: 0% to 0.050%
with a remainder comprising iron and impurities,
a total amount of V, Ti and Nb is 0.030% to 0.150%,
the metallurgical structure at a thickness ¼ portion is, by volume percentage,
martensite: 40% to 97%,
ferrite and bainite: 50% or less,
residual austenite: 3% to 20%, and
a remainder in microstructure: 5% or less,
an area ratio of residual austenite having an aspect ratio of 3 or more is 80% or more with respect to a total area of the residual austenite, and
the number of carbides having a grain diameter of 8 to 40 nm per square micrometer is five or more in the residual austenite.

2. The steel sheet according to claim 1,
wherein the chemical composition contains, by mass %, one or more of
Ni: 0.01% to 1.00%,
Mo: 0.01% to 1.00%,
Cr: 0.001% to 2.000%,
B: 0.00010% to 0.0100%,
Cu: 0.001% to 0.500%,
W: 0.0010% to 0.10%,
Ta: 0.001% to 0.10%,
Sn: 0.001% to 0.050%,
Co: 0.001% to 0.50%,
Sb: 0.001% to 0.050%,
As: 0.001% to 0.050%,
Mg: 0.0001% to 0.050%,
Ca: 0.001% to 0.040%,
Y: 0.001% to 0.050%,
Zr: 0.001% to 0.050%, and
La: 0.001% to 0.050%.

3. The steel sheet according to claim 1, further comprising:
a hot-dip galvanized layer on a surface.

4. The steel sheet according to claim 1, further comprising:
a hot-dip galvannealed layer on a surface.

5. A manufacturing method of a steel sheet, comprising:
a hot rolling step of heating a slab having the chemical composition according to claim 1 at 1150° C. or higher for one hour or longer and hot-rolling the slab to produce a hot-rolled steel sheet in which prior austenite grain diameters are less than 30 μm;
a first cooling step of cooling the hot-rolled steel sheet to a temperature range of 800° C. or lower within three seconds from an end of the hot rolling step;
a coiling step of cooling the hot-rolled steel sheet after the first cooling step to a temperature range of 300° C. or lower at an average cooling rate of 30° C./s or faster and coiling the hot-rolled steel sheet;
a cold rolling step of cold-rolling the hot-rolled steel sheet after the coiling step at a rolling reduction of 0.1% to 30% to produce a cold-rolled steel sheet;

an annealing step of heating the cold-rolled steel sheet in a temperature range of 480° C. to Ac1 at an average heating rate of 0.5 to 1.5° C./s and soaking the cold-rolled steel sheet in a temperature range of Ac1 to Ac3, a second cooling step of cooling the cold-rolled steel sheet after the annealing step at an average cooling rate of 4° C./s or faster; and a temperature retention step of retaining the cold-rolled steel sheet after the second cooling step at 300° C. to 480° C. for 10 seconds or longer.

6. The manufacturing method of a steel sheet according to claim 5, wherein the hot rolling step has a finish rolling step of continuously passing the slab through a plurality of rolling stands to perform rolling, in the finish rolling step:

a rolling start temperature in the rolling stand third from a final of the rolling stands is 850° C. to 1000° C.;

in each of the three last rolling stands in the finish rolling, the slab is rolled at a rolling reduction of larger than 10%;

an interpass time between the individual rolling stands in the three last rolling stands in the finish rolling is three seconds or shorter; and (Tn−Tn+1) that is a difference between an exit temperature Tn of the nth rolling stand and an entrance temperature Tn+1 of the (n+1)th rolling stand on the downstream side of the four last rolling stands in the finish rolling is 10° C. or more.

7. The manufacturing method of a steel sheet according to claim 5, wherein the cold-rolled steel sheet after the annealing step is controlled to be in a temperature range of (zinc plating bath temperature−40°) C to (zinc plating bath temperature+50°) C and immersed in a hot-dip galvanizing bath, thereby forming hot-dip galvanized layer.

8. The manufacturing method of a steel sheet according to claim 7, wherein the hot-dip galvanized layer is alloyed in a temperature range of 300° C. to 500° C.

9. The steel sheet according to claim 2, further comprising:

a hot-dip galvanized layer on a surface.

10. The steel sheet according to claim 2, further comprising:

a hot-dip galvannealed layer on a surface.

11. A manufacturing method of a steel sheet, comprising:

a hot rolling step of heating a slab having the chemical composition according to claim 2 at 1150° C. or higher for one hour or longer and hot-rolling the slab to produce a hot-rolled steel sheet in which prior austenite grain diameters are less than 30 μm;

a first cooling step of cooling the hot-rolled steel sheet to a temperature range of 800° C. or lower within three seconds from an end of the hot rolling step;

a coiling step of cooling the hot-rolled steel sheet after the first cooling step to a temperature range of 300° C. or lower at an average cooling rate of 30° C./s or faster and coiling the hot-rolled steel sheet;

a cold rolling step of cold-rolling the hot-rolled steel sheet after the coiling step at a rolling reduction of 0.1% to 30% to produce a cold-rolled steel sheet;

an annealing step of heating the cold-rolled steel sheet in a temperature range of 480° C. to Ac1 at an average heating rate of 0.5 to 1.5° C./s and soaking the cold-rolled steel sheet in a temperature range of Ac1 to Ac3, a second cooling step of cooling the cold-rolled steel sheet after the annealing step at an average cooling rate of 4° C./s or faster; and a temperature retention step of retaining the cold-rolled steel sheet after the second cooling step at 300° C. to 480° C. for 10 seconds or longer.

12. The manufacturing method of a steel sheet according to claim 6, wherein the cold-rolled steel sheet after the annealing step is controlled to be in a temperature range of (zinc plating bath temperature−40°) C to (zinc plating bath temperature+50°) C and immersed in a hot-dip galvanizing bath, thereby forming hot-dip galvanized layer.

* * * * *